United States Patent
Kurimura et al.

(10) Patent No.: US 8,673,105 B2
(45) Date of Patent: Mar. 18, 2014

(54) METHOD OF MANUFACTURING TRANSLUCENT RIGID SUBSTRATE LAMINATE AND TRANSLUCENT RIGID SUBSTRATE BONDING APPARATUS

(75) Inventors: Hiroyuki Kurimura, Shibukawa (JP); Hayato Miyazaki, Shibukawa (JP); Gosuke Nakajima, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/554,747

(22) Filed: Jul. 20, 2012

(65) Prior Publication Data
US 2012/0298285 A1 Nov. 29, 2012

Related U.S. Application Data

(63) Continuation of application No. PCT/JP2011/050461, filed on Jan. 13, 2011.

(30) Foreign Application Priority Data

Jan. 21, 2010 (JP) ................................ 2010-011151
Jan. 21, 2010 (JP) ................................ 2010-011155

(51) Int. Cl.
*B32B 37/02* (2006.01)
*B32B 38/10* (2006.01)
*B32B 41/00* (2006.01)

(52) U.S. Cl.
USPC ........................................... 156/275.7

(58) Field of Classification Search
USPC ............. 156/272.2, 273.3, 275.7, 273.5, 247, 156/701, 703, 704, 711, 182, 99, 101
See application file for complete search history.

(56) References Cited

U.S. PATENT DOCUMENTS

| 5,624,521 | A  | 4/1997  | Hed .......................... 156/275.7 |
| 6,004,413 | A  | 12/1999 | Couttenier .................... 156/99 |
| 6,309,485 | B1 | 10/2001 | Miyamoto et al. ............. 156/64 |
| 6,475,292 | B1 | 11/2002 | Sahbari ............................. 134/3 |
| 6,627,309 | B2 | 9/2003  | Stebbings et al. ............ 428/352 |

(Continued)

FOREIGN PATENT DOCUMENTS

| JP | 60-199646 | 10/1985 |
| JP | 02-22150  | 1/1990  |

(Continued)

OTHER PUBLICATIONS

International Preliminary Report on Patentability dated Aug. 7, 2012, issued in corresponding International Patent Application No. PCT/JP2011/050461.

(Continued)

*Primary Examiner* — Daniel McNally
(74) *Attorney, Agent, or Firm* — Stein IP, LLC

(57) ABSTRACT

Provided is a method of manufacturing a translucent rigid substrate laminate to improve a positional precision while increasing production efficiency. Further, a translucent rigid substrate bonding apparatus contributing to improvement of the positional precision while increasing production efficiency of a plate-shaped product is provided. In the method of manufacturing the translucent rigid substrate laminate and the translucent rigid substrate bonding apparatus according to the present invention, when translucent rigid substrates are bonded in a predetermined positional relationship by interposing a photo-curable fixing agent therebetween, only the fixing agent present on an outer boundary portion of both translucent rigid substrates is cured for provisional fastening.

20 Claims, 9 Drawing Sheets

(56) References Cited

U.S. PATENT DOCUMENTS

| | | | |
|---|---|---|---|
| 6,740,190 B2 * | 5/2004 | Takase | 156/267 |
| 2001/0046644 A1 | 11/2001 | Ukachi et al. | 430/281.1 |
| 2002/0062787 A1 | 5/2002 | Hashizume et al. | 118/664 |
| 2003/0205333 A1 | 11/2003 | Hayafuji et al. | 156/580 |
| 2004/0094264 A1 | 5/2004 | Yamaguchi et al. | 156/273.3 |
| 2009/0218034 A1 | 9/2009 | Kawabe | |
| 2012/0298285 A1 | 11/2012 | Kurimuru et al. | 156/64 |
| 2013/0081752 A1 | 4/2013 | Kurimura et al. | 156/64 |

FOREIGN PATENT DOCUMENTS

| | | |
|---|---|---|
| JP | 11-271782 | 10/1999 |
| JP | 2000-44292 | 2/2000 |
| JP | 2000-319043 | 11/2000 |
| JP | 2001-192246 | 7/2001 |
| JP | 2002-522340 | 7/2002 |
| JP | 2003-270606 | 9/2003 |
| JP | 2005-132692 | 5/2005 |
| JP | 2009-1478 | 1/2009 |
| JP | 2009-40617 | 2/2009 |
| JP | 2009-205065 | 9/2009 |
| JP | 2009-256125 | 11/2009 |

OTHER PUBLICATIONS

International Search Report; Application No. PCT/JP2011/050461; Form PCT/ISA/210 (2 pages).

International Search Report mailed Mar. 22, 2011, issued in corresponding International Application No. PCT/JP2011/050464.

International Preliminary Report on Patentability dated Aug. 7, 2012, issued in corresponding International Patent Application No. PCT/JP2011/050464.

English translation of the claims of Japanese Patent Application Publication No. JP 60-199646, which was cited in the International Search Report mailed Mar. 22, 2011, issued in International Patent Application No. PCT/JP2011/050464.

U.S. Appl. No. 13/574,510, filed Jul. 20, 2012, Hiroyuki Kurimura et al., Denki Kagaku Kogyo Kabushiki Kaisha.

PCT/IB/338 for PCT/JP2011/062619; mailed Jan. 24, 2013; 1 page.

PCT/IB/373 for PCT/JP2011/062619; issued Jan. 15, 2013; 1 page.

International Search Report for PCT/JP2011/062619; mailed Jul. 5, 2011, 8 pages.

U.S. Appl. No. 13/574,510, filed Jul. 20, 2012, Hiroyuki Kurimura, Denki Kagaku Kogyo Kabushiki Kaisha.

U.S. Appl. No. 13/703,858, filed Dec. 12, 2012, Hiroyuki Kurimura, Denki Kagaku Kogyo Kabushiki Kaisha.

* cited by examiner

METHOD OF MANUFACTURING TRANSLUCENT RIGID SUBSTRATE LAMINATE AND TRANSLUCENT RIGID SUBSTRATE BONDING APPARATUS

CROSS-REFERENCE TO RELATED APPLICATIONS

This application is a continuation application of PCT International Application No. PCT/JP2011/050461, filed Jan. 13, 2011 designating the United States, which claims the benefit of Japanese Patent Application Nos., 2010-011151 and 2010-011155, both filed Jan. 21, 2010, in the Japanese Intellectual Property Office, the disclosures of which are incorporated herein by reference.

BACKGROUND OF THE INVENTION

1. Field of the Invention

The present invention relates to a method of manufacturing a translucent rigid substrate laminate and a translucent rigid substrate bonding apparatus, and particularly to a method of manufacturing a plate substrate laminate for manufacturing a protection substrate of a display element and a plate glass bonding apparatus used in a process of manufacturing the protection glass of the display element.

2. Description of the Related Art

Display elements such as liquid crystal displays (LCDs), organic EL displays (OELDs), electroluminescent displays (ELDs), field emission displays (FEDs), and plasma displays (PDPs) are used in display devices of various kinds of electronic equipment such as televisions, laptop computers, car navigations, electronic calculators, mobile phones, electronic schedulers and personal digital assistants (PDAs). Further, a plate glass product for protection is generally installed to face the display element in order to protect the display element.

The plate glass product is processed in proper size and shape so that the plate glass corresponds to each display device, but it is required that a large amount of plate glass products are processed at high production efficiency in order to cope with a cost level required in the market.

Accordingly, Japanese Patent Application Laid-Open No. 2009-256125 (Patent Literature 1) proposes a method of increasing production efficiency of a plate glass product. Specifically, Japanese Patent Application Laid-Open No. 2009-256125 proposes "a method of processing a plate glass, comprising: forming a material glass block (A) obtained by laminating a plurality of material plate glasses 1 and, at the same time, integrally fixing each material plate glass 1 by a strippable fixing material 2 interposed between the material plate glasses 1, forming a division glass block (B) having a small area by dividing the material glass block (A) in a surface direction, forming a product glass block (C) in a product form when viewed in a plan view by processing at least an outer boundary of the division glass block (B), and individually separating the product glass block (C) after an edge face of the product glass block (C) is processed"(claim 1). Accordingly, there is described that "since division, external shape processing and edge face processing are performed while a plurality of material plate glasses are laminated, a plurality of plate glass products may be obtained by a few processes and productivity is high".

Further, Japanese Patent Application Laid-Open No. 2009-256125 describes that "the fixing material 2 interposed between the material plate glasses 1 is a photo-curable liquid fixing material that is cured when UV is irradiated and then softened when a temperature is increased (claim 4). Accordingly, there is described that "if pressure is applied in upper and lower directions by interposing the photo-curable liquid fixing agent between the upper and lower material plate glasses, the liquid fixing agent spreads to have a constant thickness in a film form on the entire surface between the upper and lower material plate glasses, and if infrared rays are irradiated in this state, the liquid fixing agent spreading in the film form is cured to integrally fix the upper and lower plate glasses. Therefore, a plurality of material plate glasses may be rapidly laminated with a high precision so as to be integrally fixed. In addition, after final processing (edge face processing), if the product glass block is immersed in warm water and the like to increase the temperature, the fixing agent cured between the plate glasses is softened and separated in a film form. It is described that therefore, it is easy to recover and treat the fixing agent without causing environmental pollution.

The column of "Best Embodiments for Carrying Out the Invention" of Japanese Patent Application Laid-Open No. 2009-256125 describes that twenty material plate glasses are laminated while the photo-curable liquid fixing agent is interposed between the material plate glasses, subsequently, the fixing agent is cured by irradiating UV (UV ray) to the upper surface of the laminated material plate glass, and the material glass block where the upper and lower material plate glasses are integrally fixed is formed.

PRIOR ART

Patent literature

Patent literature 1: Japanese Patent Application Laid-Open No. 2009-256125

SUMMARY OF THE INVENTION

Problems to be Solved by the Invention

According to a method of processing a plate glass described in Japanese Patent Application Laid-Open No. 2009-256125, it is possible to manufacture a plate glass product having a given shape with high production efficiency. However, some of electronic equipment require that a desired printing pattern (for example, a design of a display screen of a mobile phone) is formed on a plate glass, and in this case, a high positional precision with respect to the pattern to be printed is required (for example, an allowable error is about 10 to 30 μm).

In the method described in Japanese Patent Application Laid-Open No. 2009-256125, twenty material plate glasses are laminated while the photo-curable liquid fixing agent is interposed between the material plate glasses, subsequently, the fixing agent is cured by irradiating UV (UV ray) to the upper surface of the laminated material plate glass, and the material glass block where the upper and lower material plate glasses are integrally fixed is formed. However, since the fixing agent is not cured while the material plate glass is laminated and slight misalignment easily occurs between the glass surfaces, said procedure is not suitable for alignment with a high precision. That is, it is difficult to obtain high positional precision in the method described in Japanese Patent Application Laid-Open No. 2009-256125.

Further, Japanese Patent Application Laid-Open No. 2009-256125 discloses the invention of the method of bonding glasses but does not describe an apparatus for implementing the same. It is preferable that an apparatus for bonding glasses be provided in order to perform industrial mass-production.

Therefore, it is an object of the present invention to provide a method of manufacturing a translucent rigid substrate laminate to improve a positional precision. It is another object of the present invention to provide a method of manufacturing a plate-shaped product by using the method of manufacturing the translucent rigid substrate laminate. It is yet another object of the present invention to provide a translucent rigid substrate bonding apparatus contributing to improvement of the positional precision while increasing production efficiency of the plate-shaped product.

Means for Solving the Problem

The present inventors have intensively studied to solve the aforementioned problems, and found that, when translucent rigid substrates are bonded in a predetermined positional relationship by interposing a photo-curable fixing agent therebetween, it is effective to cure only an outer boundary portion of the fixing agent interposed and spreading between both translucent rigid substrates for provisional fastening (provisional irradiation).

The laminate of the provisionally fastened translucent rigid substrates does not easily cause displacement even though the substrates are laminated. Meanwhile, the translucent rigid substrates are bonded only at the outer boundary portion. Therefore, it is easy to delaminate and then perform a provisional fastening again in case where defect products are found after a test for positional precision of bonding is conducted.

Further, the time required for provisional fastening is set so that irradiation energy per unit area is about 1/5 as compared to the case where the entire fixing agent spreading on the surface of the translucent rigid substrate is cured. Accordingly, if the fixing agent present around the center of the surface of the substrate is cured (full irradiation) after a plurality of translucent rigid substrates are laminated by provisional fastening, it is possible to manufacture the translucent rigid substrate laminate with a high positional precision and high production efficiency.

In an aspect of the present invention accomplished based on the aforementioned view, a method of manufacturing a translucent rigid substrate laminate includes: 1) a process of preparing a first translucent rigid substrate, 2) a process of preparing a second translucent rigid substrate, 3) a process of applying a photo-curable fixing agent to a first surface of the first translucent rigid substrate and/or a first surface of the second translucent rigid substrate, 4) a process of allowing the first surface of the first translucent rigid substrate and the first surface of the second translucent rigid substrate to face each other so that both surfaces are parallel to each other under a predetermined positional relationship in a surface direction, 5) a process of applying a given pressure to the first surface of the first translucent rigid substrate and the first surface of the second translucent rigid substrate while maintaining the positional relationship to bond both translucent rigid substrates, 6) a process of irradiating light for curing only an outer boundary portion of the fixing agent interposed and spreading between both translucent rigid substrates while the pressure is maintained to form a provisionally fastened translucent rigid substrate laminate, 7) a full irradiation process of irradiating light for curing the uncured fixing agent present in the provisionally fastened translucent rigid substrate laminate to form a fully fastened translucent rigid substrate laminate, and 8) a process of repeating processes 1) to 7) at least one time by regarding the fully fastened translucent rigid substrate laminate as the first translucent rigid substrate to form the fully fastened translucent rigid substrate laminate where at least three translucent rigid substrates are bonded.

In another aspect of the present invention, a method of manufacturing a translucent rigid substrate laminate includes: 1) a process of preparing a first translucent rigid substrate, 2) a process of preparing a second translucent rigid substrate, 3) a process of applying a photo-curable fixing agent to a first surface of the first translucent rigid substrate and/or a first surface of the second translucent rigid substrate, 4) a process of allowing the first surface of the first translucent rigid substrate and the first surface of the second translucent rigid substrate to face each other so that both surfaces are parallel to each other under a predetermined positional relationship in a surface direction, 5) a process of applying a given pressure to the first surface of the first translucent rigid substrate and the first surface of the second translucent rigid substrate while maintaining the positional relationship to bond both translucent rigid substrates, 6) a process of irradiating light for curing only an outer boundary portion of the fixing agent interposed and spreading between both translucent rigid substrates while the pressure is maintained to form a provisionally fastened translucent rigid substrate laminate, 7') a process of repeating processes 1) to 6) at least one time by regarding the provisionally fastened translucent rigid substrate laminate as the first translucent rigid substrate to form the provisionally fastened translucent rigid substrate laminate where at least three translucent rigid substrates are bonded, and 8') a full irradiation process of irradiating light for curing the uncured fixing agent present in the provisionally fastened translucent rigid substrate laminate obtained in process 7') to form a fully fastened translucent rigid substrate laminate.

In an embodiment of the method of manufacturing the translucent rigid substrate laminate according to the present invention, the method further includes: 8") a process of repeating processes 1) to 6) at least one time by regarding the fully fastened translucent rigid substrate laminate obtained in process 8') as the first translucent rigid substrate to form a complex translucent rigid substrate laminate, and 8''') a full irradiation process of irradiating light for curing the uncured fixing agent present in the complex translucent rigid substrate laminate obtained in process 8") to form a fully fastened translucent rigid substrate laminate having the increased lamination number.

In another embodiment of the method of manufacturing the translucent rigid substrate laminate according to the present invention, the outer boundary portion is present in a margin region where a portion of the plate-shaped product is not formed.

In yet another embodiment of the method of manufacturing the translucent rigid substrate laminate according to the present invention, the full irradiation process is performed while the given pressure is applied to surfaces of the bonded translucent rigid substrates.

In yet another embodiment of the method of manufacturing the translucent rigid substrate laminate according to the present invention, the full irradiation process is performed after bubbles mixed with the uncured fixing agent are moved to a position at which shape processing is not performed.

In yet another embodiment of the method of manufacturing the translucent rigid substrate laminate according to the present invention, a mark for alignment is attached to the surface of each translucent rigid substrate, and process 4) includes performing position adjustment while imaging the mark by an imaging device.

In yet another embodiment of the method of manufacturing the translucent rigid substrate laminate according to the present invention, a given printing pattern and/or plating pattern for exhibiting any one of the functions of a translucent rigid substrate product is attached to the surface of each translucent rigid substrate.

In yet another embodiment of the method of manufacturing the translucent rigid substrate laminate according to the present invention, the fixing agent includes a granular material.

In yet another embodiment of the method of manufacturing the translucent rigid substrate laminate according to the present invention, the amount of irradiation of light is in the range of 1 to 500 mJ/cm2 when measured by a cumulative illuminometer using a light receptor of 365 nm.

In another embodiment of the method of manufacturing the translucent rigid substrate laminate according to the present invention, the translucent rigid substrate is a plate glass.

In another aspect of the present invention, a method of manufacturing a plate-shaped product, includes: 9) a process of dividing the translucent rigid substrate laminate obtained by using the method of manufacturing the translucent rigid substrate laminate in a thickness direction to form a desired number of the divided translucent rigid substrate laminates, 10) a process of performing desired shape processing with respect to each of the divided translucent rigid substrate laminates, and 11) a process of heating the translucent rigid substrate laminate after the shape processing to delaminate the bonded translucent rigid substrates from each other and form a plurality of plate-shaped products.

In an embodiment of the method of manufacturing the plate-shaped product according to the present invention, the method further includes: a process of bringing the divided translucent rigid substrate laminates into contact with a delaminating agent under temperature and time conditions required to reduce adhesion strength of an exposed portion of an edge of an external side of the fixing agent interposed between the translucent rigid substrates between processes 9) and 10).

In another embodiment of the method of manufacturing the plate-shaped product according to the present invention, the delaminating agent includes one kind or two kinds or more selected from a solvent, an oxidizing agent and a surfactant.

In yet another embodiment of the method of manufacturing the plate-shaped product according to the present invention, the delaminating agent includes one kind or two kinds or more selected from water, alcohols, an oxidizing agent and a surfactant.

In yet another embodiment of the method of manufacturing the plate-shaped product according to the present invention, the delaminating agent includes the water, the alcohols and the surfactant in a mass ratio of 30 to 50:30 to 50:5 to 20.

In yet another embodiment of the method of manufacturing the plate-shaped product according to the present invention, the delaminating agent includes benzyl alcohol.

In yet another embodiment of the method of manufacturing the plate-shaped product according to the present invention, the delaminating agent includes an anionic surfactant.

In yet another embodiment of the method of manufacturing the plate-shaped product according to the present invention, the delaminating agent includes a sulfonic acid type surfactant.

In yet another embodiment of the method of manufacturing the plate-shaped product according to the present invention, a liquid temperature of the delaminating agent is 20 to 40° C. and a contact time to the delaminating agent is 1 to 20 min.

In another aspect of the present invention, a translucent rigid substrate bonding apparatus includes: an upper stage having an absorption hole for vacuum adsorption of a translucent rigid substrate of an upper side and maintaining the translucent rigid substrate of the upper side, a press unit for moving the upper stage in a Z-axis direction, an absorption unit for providing absorption force to the absorption hole, a lower stage for holding the translucent rigid substrate of a lower side, a means for moving the lower stage in an X-axis direction, a Y-axis direction and a 0-axis direction, a means for applying a photo-curable fixing agent to any one side or both sides of a lower surface of the translucent rigid substrate of the upper side and an upper surface of the translucent rigid substrate of the lower side, and a light irradiation component disposed at a position at which light can be irradiated to an outer boundary portion of a bonding surface of both translucent rigid substrates.

In an embodiment of the translucent rigid substrate bonding apparatus according to the present invention, the light irradiation component is disposed on a lower surface of the upper stage along the outer boundary of the translucent rigid substrate to be held, and irradiates light downward.

Light may be selectively irradiated to the fixing agent present on the outer boundary portion of the translucent rigid substrate by disposing the light irradiation component as described above. Since light is irradiated to the translucent rigid substrate of the upper side, the irradiation is particularly effective for the case where one translucent rigid substrate of the upper side is laminated on the translucent rigid substrate of the lower side (one translucent rigid substrate may be present or the laminate of two or more translucent rigid substrates may be present).

In another embodiment of the translucent rigid substrate bonding apparatus according to the present invention, the light irradiation component is disposed on an upper surface of the lower stage along the outer boundary of the translucent rigid substrate to be held, and irradiates light upward.

Likewise, light may be selectively irradiated to the fixing agent present on the outer boundary portion of the translucent rigid substrate by disposing the light irradiation component as described above. Since light is irradiated to the translucent rigid substrate of the lower side, the irradiation is particularly effective to the case where the translucent rigid substrate of the lower side is laminated one by one on the translucent rigid substrate of the upper side (one translucent rigid substrate may be present or the laminate of two or more translucent rigid substrates may be present). In this case, if the translucent rigid substrate laminate is not drawn but held on the upper stage after the bonding, it is possible to continuously laminate the translucent rigid substrate by providing the translucent rigid substrate to be subsequently laminated from the lower stage.

In yet another embodiment of the translucent rigid substrate bonding apparatus according to the present invention, the light irradiation component is disposed so as to surround lateral surfaces of the outer boundary of both translucent rigid substrates to be bonded, and irradiates light on the lateral surfaces of the outer boundary.

In this case, likewise, light may be selectively irradiated to the fixing agent present on the outer boundary portion of the translucent rigid substrate. Since energy of light irradiated to the lateral surface of the outer boundary is absorbed by an adhesive, light does not reach around the center of the translucent rigid substrate. Further, the light irradiation component may be tracked to the height of the bonding surface by moving the light irradiation component in a Z-axis direction. Accordingly, the irradiation may be applied to both of the case where one translucent rigid substrate of the lower side is laminated on the translucent rigid substrate of the upper side, and the case where one translucent rigid substrate of the upper side is laminated on the translucent rigid substrate of the lower side.

If the translucent rigid substrate laminate is not drawn but held on the upper stage after the bonding, it is possible to continuously laminate the translucent rigid substrate by providing the translucent rigid substrate to be subsequently laminated from the lower stage.

In yet another embodiment of the translucent rigid substrate bonding apparatus according to the present invention, the translucent rigid substrate bonding apparatus further includes: an imaging unit for imaging an alignment mark installed on the surfaces of the translucent rigid substrates of the upper side and lower side, a image processing unit for detecting the degree of misalignment of the alignment mark provided on the surfaces of the upper side and lower side based on an imaging result, and a control unit for controlling means for moving the lower stage based on the detected degree of misalignment.

The substrates may be laminated with a higher positional precision by finely adjusting the positional relationship between the translucent rigid substrates by using the imaging unit. Accordingly, in the case where the printing pattern or the plating pattern is attached to the surface of the translucent rigid substrate, it is possible to deal with even the case where the high positional precision is required.

In yet another embodiment of the translucent rigid substrate bonding apparatus according to the present invention, the outer boundary portion on which light is irradiated by the light irradiation component is a margin region where a portion of a plate-shaped product is not formed.

In the case where light is selectively irradiated to the margin region, the substrate of a portion constituting the plate-shaped product ends without irradiation of light for provisional fastening. Accordingly, when the full irradiation is to be performed, there are advantages in that history of light irradiation of the aforementioned portion can become uniform and distortion of the substrate due to distortion of the fixing agent can be suppressed.

In another embodiment of the translucent rigid substrate bonding apparatus according to the present invention, the translucent rigid substrate held on the upper stage and/or the lower stage is a laminate of two or more translucent rigid substrates.

Three or more substrate laminates may be manufactured by setting the translucent rigid substrates of the upper side and/or lower side attached in the present invention with a laminate formed of two or more translucent rigid substrates.

In yet another embodiment of the translucent rigid substrate bonding apparatus according to the present invention, the means for applying the fixing agent applies the fixing agent including a granular material.

Since the fixing agent may include the granular material to make the thickness of the fixing agent constant, the processing precision is improved. Further, a delaminating property is improved in subsequent delaminating by a difference in line expansion coefficient of the fixing agent component and the granular material.

In yet another embodiment of the translucent rigid substrate bonding apparatus according to the present invention, the translucent rigid substrate is a plate glass.

Additional aspects and/or advantages of the invention will be set forth in part in the description which follows and, in part, will be obvious from the description, or may be learned by practice of the invention.

According to the present invention, it is possible to manufacture a translucent rigid substrate laminate with a high positional precision. Therefore, it is possible to industrially manufacture a plate-shaped product with high dimensional precision. The present invention may be appropriately used in, for example, a method of mass-producing a protection glass of a display element.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
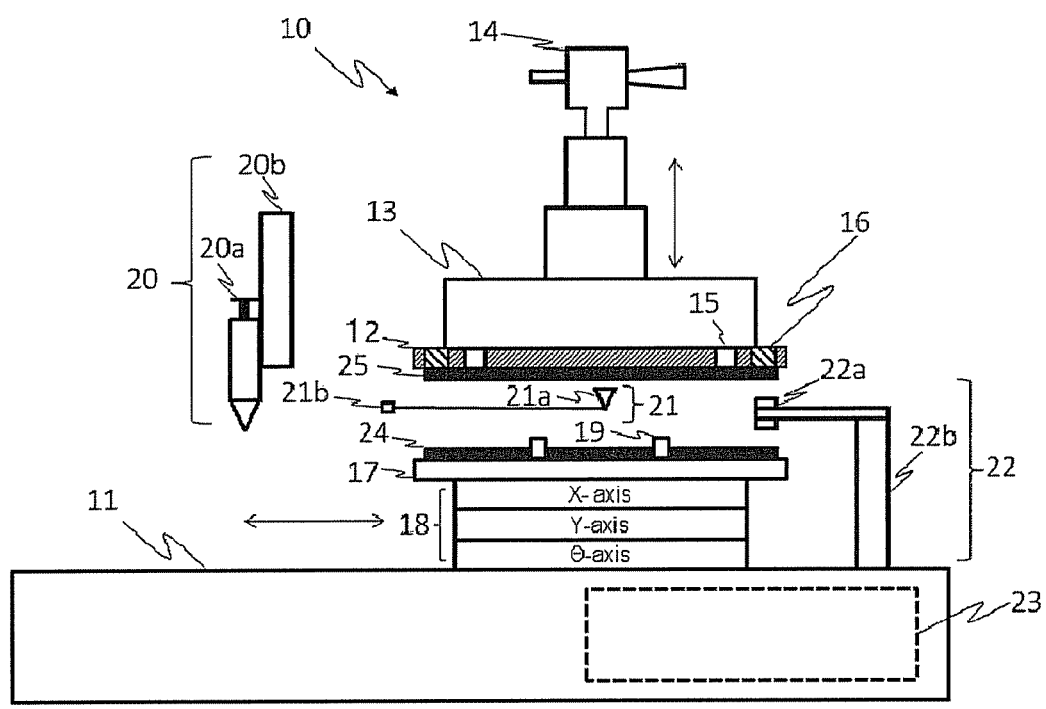
FIG. 1 is a schematic diagram illustrating a first example of a translucent rigid substrate bonding apparatus that can be used in an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

<First Embodiment>

In a first embodiment of a method of manufacturing a translucent rigid substrate laminate according to the present invention, the following processes are performed:

1) a process of preparing a first translucent rigid substrate, 2) a process of preparing a second translucent rigid substrate, 3) a process of applying a photo-curable fixing agent to a first surface of the first translucent rigid substrate and/or a first surface of the second translucent rigid substrate, 4) a process of allowing the first surface of the first translucent rigid substrate and the first surface of the second translucent rigid substrate to face each other so that both surfaces are parallel to each other under a predetermined positional relationship in a surface direction, 5) a process of applying a given pressure to the first surface of the first translucent rigid substrate and the first surface of the second translucent rigid substrate while maintaining the positional relationship to bond both translucent rigid substrates, 6) a process of irradiating light for curing only an outer boundary portion of the fixing agent interposed and spreading between both translucent rigid substrates while the pressure is maintained to form a provisionally fastened translucent rigid substrate laminate, 7) a full irradiation process of irradiating light for curing the uncured fixing agent present in the provisionally fastened translucent rigid substrate laminate to form a fully fastened translucent rigid substrate laminate, and 8) a process of repeating processes 1) to 7) at least one time by regarding the fully fastened translucent rigid substrate laminate as the first translucent rigid substrate to form the fully fastened translucent rigid substrate laminate where at least three translucent rigid substrates are bonded.

In processes (1) and (2), the translucent rigid substrate that is a target to be processed is prepared. The translucent rigid substrate is not particularly limited, but examples thereof may include a plate glass (a material plate glass, a transparent conductive film-attached glass substrate, a glass substrate on which an electrode or a circuit is formed and the like), a sapphire substrate, a quartz substrate, a plastic substrate, a magnesium fluoride substrate and the like. Examples of glass may include reinforced glass. The size of the translucent rigid substrate is not particularly limited, but the translucent rigid substrate typically has an area of about 10,000 to 250,000 $mm^2$ and a thickness of about 0.1 to 2 mm. Generally, the translucent rigid substrates each have the same size. A given printing pattern or plating pattern for exhibiting any one of the functions of the plate-shaped product may be attached to the surface of the translucent rigid substrate, but is not limited. Examples of the printing pattern may include a design of a display screen of a mobile phone, and examples of the plating pattern may include a rotary encoder where a chrome plating pattern is formed.

In process (3), a photo-curable fixing agent is applied to the first surface of the first translucent rigid substrate and/or the first surface of the second translucent rigid substrate. The photo-curable fixing agent is a fixing agent that is cured by irradiating light such as UV and softened by heating at high temperatures, and various kinds of fixing agents are known. Any known photo-curable fixing agents may be used in the present invention, and the photo-curable fixing agent is not particularly limited. The photo-curable fixing agent may be applied to a bonding surface of the translucent rigid substrate of any one side, and is preferably applied to the bonding surfaces of both translucent rigid substrates in view of improvement in adhesion property.

Examples of the photo-curable fixing agent appropriately used in the present invention may include, as described in WO 2008/018252, an adhesive composition including (A) polyfunctional (meth) (meth) acrylate, (B) monofunctional (meth) (meth) acrylate and (C) a photopolymerization initiator.

As (A) polyfunctional (meth) acrylate, polyfunctional (meth) acrylate oligomer/polymers having two or more (meth) acryloyl groups at an end or side chain of the oligomer/polymer, and a polyfunctional (meth) acrylate monomers having two or more (meth) acryloyl groups may be used. Examples of the polyfunctional (metha)acrylate oligomer/polymer may include 1,2-polybutadiene terminated urethane (meth) acrylate (for example, "TE-2000" and "TEA-1000" manufactured by Nippon Soda Co., Ltd.), a hydrogenated product thereof (for example, "TEAM 000" manufactured by Nippon Soda Co., Ltd.), 1,4-polybutadiene terminated urethane (meth) acrylate (for example, "BAC-45" manufactured by Osaka Organic Chemical Industry Ltd.), polyisoprene terminated (meth) acrylate and polyester-based urethane (metha)acrylate (for example, "UV-2000B", "UV-3000B" and "UV-7000B" manufactured by The Nippon Synthetic Chemical Industry Co., Ltd., and "KHP-11" and "KHP-17" manufactured by Negami Chemical Industrial, Co., Ltd.), polyether-based urethane (meth) acrylate (for example, "UV-3700B" and "UV-6100B" manufactured by The Nippon Synthetic Chemical Industry Co., Ltd.), bisphenol A type epoxy (meth) acrylate or the like.

Examples of the bifunctional (meth) acrylate monomer may include 1,3-butylene glycol di (meth) acrylate, 1,4-butandiol di (meth) acrylate1,6-hexanediol di (meth) acrylate, 1,9-nonanediol di (meth) acrylate, neopentylglycol di (meth) acrylate, dicyclopentanyl di (meth) acrylate, 2-ethyl-2-butyl-propandiol di (meth) acrylate, neopentyl glycol-modified trimethylolpropane di (meth) acrylate, stearic acid-modified pentaerythritol di (meth) acrylate, polypropylene glycol di (meth) acrylate, 2,2-bis(4-(meth) acryloxydiethoxyphenyl) propane, 2,2-bis(4-(meth) acryloxypropoxyphenyl) propane, 2,2-bis(4-(meth) acryloxytetraethoxyphenyl) propane or the like. Examples of the trifunctional (meth) acrylate monomer may include trimethylolpropane tri (meths) acrylate, tris[(meth)acryloxyethyl] isocyanurate and the like. Examples of tetrafunctional or more (meth) acrylate monomer may include dimethylolpropane tetra (meth) acrylate, pentaerythritol tetra (meth) acrylate, pentaerythritolethoxy tetra (meth) acrylate, dipentaerythritol penta (meth) acrylate, dipentaerythritol hexa (meth) acrylate or the like.

Examples of (B) the monofunctional (meth) acrylate monomer may include methyl (meth) acrylate, ethyl (meth) acrylate, propyl (meth) acrylate, butyl (meth) acrylate, 2-ethyl hexyl (meth) acrylate, isooctyl (meth) acrylate, isodecyl (meth) acrylate, lauryl (meth) acrylate, stearyl (meth) acrylate, phenyl (meth) acrylate, cyclohexyl (meth) acrylate, dicyclopentanyl (meth) acrylate, dicyclopentenyl (meth) acrylate, dicyclopentanyl (meth) acrylate, dicyclopentenyloxyethyl (meth) acrylate, isobornyl (meth) acrylate, methoxylated cyclodecatriene (meth) acrylate, 2-hydroxyethyl (meth) acrylate, 2-hydroxypropyl (metha)acrylate, 3-hydroxypropyl (metha)acrylate, 4-hydroxybutyl (meth) acrylate, tetrahydrofurfuryl (meth) acrylate, 2-hydroxy-3-phenoxypropyl (meth) acrylate, glycidyl (meth) acrylate, caprolacton-modified tetrahydrofurfuryl (meth) acrylate, 3-chloro-2-hydroxypropyl (meth) acrylate, N,N-dimethylaminoethyl (meth) acrylate, N,N-diethylaminoethyl (meth) acrylate, t-butylaminoethyl (meth) acrylate, ethoxycarbonylmethyl (meth) acrylate, phenolethylene oxide-modified (meth) acrylate, phenol 2 mol (ethylene oxide-modified) (metha) acrylate, phenol 4 mol (ethylene oxide-modified) (meth) acrylate, paracumylphenolethylene oxide-modified (meth) acrylate, nonylphenolethylene oxide-modified (meth) acrylate, nonylphenol 4 mol (ethylene oxide-modified) (meth) acrylate, nonylphenol 8 mol (ethylene oxide-modified) (meth) acrylate, nonylphenol 2.5 mol (propylene oxide-modified) (meth) acrylate, 2-ethylhexylcarbitol (meth) acrylate, ethylene oxide-modified phthalic acid (meth) acrylate, ethylene oxide-modified succinic acid (meth) acrylate, trifluoroethyl (meth) acrylate, acrylic acid, methacrylic acid, maleic acid, fumaric acid, ω-carboxy-polycaprolacton mono (meth) acrylate, phthalic acid monohydroxyethyl (meth)acrylate, (meth) acrylic acid dimer, β-(meth) acryloyloxyethyl hydrogen succinate, n-(meth) acryloyl oxyalkylhexahydrophthalimide, 2-(1,2-cyclohexacarboxyimide)ethyl (meth) acrylate, ethoxydiethyleneglycol (meth) acrylate, benzyl (meth) acrylate and the like.

A mixing ratio of (A) polyfunctional (meth) acrylate and (B) monofunctional (meth) acrylate is preferably (A):(B)=5: 95 to 95:5 (parts by mass). If the ratio is 5 parts by mass or more, there is no worry of a reduction in initial adhesion property, and if the ratio is 95 parts by mass or less, a delaminating property may be ensured. The cured fixing agent is delaminated in a film form by being immersed in warm water. The content of (B) monofunctional (meth) acrylate is more preferably 40 to 80 parts by mass based on 100 parts by mass of the total content of (A) and (B).

(C) the photopolymerization initiator is mixed to promote photocuring of the resin composition by being sensitized by visible rays or active rays of UV, and various kinds of known photopolymerization initiators may be used. Specific examples thereof may include benzophenone or a derivative thereof; benzyl or a derivative thereof; anthraquinone or a derivative thereof; benzoin; a benzoin derivative such as benzoinmethylether, benzoinethylether, benzoinpropylether, benzoinisobutylether and benzyldimethylketal; an acetophenon derivative such as diethoxy acetophenon and 4-t-butyl-trichloroacetophenon; 2-dimethylaminoethylbenzoate; p-dimethylaminoethylbenzoate; diphenyl disulfide; thioxanthone or a derivative thereof; camphorquinone; a camphorquinone derivative such as 7,7-dimethyl-2,3-dioxobicyclo [2.2.1]heptane-1-carboxylic acid, 7,7-dimethyl-2,3-dioxobicyclo [2.2.1]heptane-1-carboxy-2-bromoethylester, 7,7-dimethyl-2,3-dioxobicyclo [2.2.1]heptane-1-carboxy-2-methylester and 7,7-dimethyl-2,3-dioxobicyclo [2.2.1]heptane-1-carboxylic acid chloride; a α-aminoalkylphenon derivative such as 2-methyl-1-[4-(methylthio)phenyl]-2-morpholinopropan-1-on and 2-benzyl-2-dimethyl amino-1-(4-morpholinophenyl)-butanone-1; an acylphosphine oxide derivative such as benzoyldiphenylphosphine oxide, 2,4,6-trimethylbenzoyldiphenylphosphine oxide, benzoyldiethoxyphosphine oxide, 2,4,6-trimethyl benzoyl dimethoxyphenylphosphine oxide and 2,4,6-trimethyl benzoyl diethoxyphenylphosphine oxide; oxy-phenyl-acetic acid 2-[2-oxo-2-phenyl-acetoxy-ethoxy]-ethyl ester and/or oxy-phenyl-acetic acid 2-[2-hydroxy-ethoxy]-ethyl ester. The photopolymerization initiator may be used alone or in combination of two or more kinds thereof. Among the initiators, in view of a large effect, it is preferable to use one or two or more kinds of the group consisting of 1 benzyldimethylketal, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

The content of (C) the photopolymerization initiator is preferably 0.1 to 20 parts by mass and more preferably 0.5 to 10 parts by mass based on 100 parts by mass of the total content of (A) and (B). If the content is 0.1 parts by mass or more, a curing promotion effect may be definitely obtained, and if the content is 20 parts by mass or less, a sufficient curing speed may be obtained. Addition of component (C) in a content of 1 part by mass or more is more preferable in that curing can be performed irrespective of the amount of irradiation of light, and the degree of crosslinking of a cured body of the composition is increased, suppressing misalignment and the like during cutting processing and improving a delaminating property.

It is preferable that the photo-curable fixing agent include the granular material (D) that is not dissolved in components (A), (B) and (C) of the fixing agent. Therefore, since the composition after curing can be maintained in a constant thickness, a process precision is improved. Further, line expansion coefficients of the cured body of the adhesive composition and the granular material (D) are different from each other, such that a delaminating property is improved when delaminating is performed after the translucent rigid substrate is bonded by using the adhesive composition.

Any one of generally used organic particles or inorganic particles may be used as the material of the granular material (D). Specifically, examples of the organic particles may include polyethylene particles, polypropylene particles, crosslinked polymethylmethacrylate particles, crosslinked polystyrene particles and the like. Examples of the inorganic particles may include ceramic particles such as glass, silica, alumina and titanium.

It is preferable that the granular material (D) have a sphere shape in view of improvement of processing precision, that is, control of the film thickness of the adhesive. It is preferable that an average particle size of the granular material (D) by a laser method be in the range of 20 to 200 μm. If the average particle size of the granular material is less than 20 μm, a delaminating property is poor, and if the average particle size is 200 μm or more, dislocation easily occurs when a provisionally fixed member is processed and a dimension precision is poor. In view of the delaminating property and the dimension precision, the average particle size (D50) is preferably 35 to 150 μm and more preferably 50 to 120 μm. A particle size distribution is measured by a laser diffraction type particle size distribution measurement device.

The use amount of the granular material (D), in view of adhesion property, processing precision and delaminating property, is preferably 0.1 to 20 parts by mass, more preferably 0.2 to 10 parts by mass, and most preferably 0.2 to 6 parts by mass based on 100 parts by mass of the total amount of (A) and (B).

A polymerization inhibitor (E) may be added to the photo-curable fixing agent in order to improve storage stability. Examples of the polymerization inhibitor may include methylhydroquinone, hydroquinone, 2,2-methylene-bis(4-methyl-6-tertiarybutylphenol, catechol, hydroquinonemonomethylether, monotertiarybutylhydroquinone, 2,5-ditertiarybutylhydroquinone, p-benzoquinone, 2,5-diphenyl-p-benzoquinone, 2,5-ditertiarybutyl-p-benzoquinone, picric acid, citric acid, phenothiazine, tertiarybutylcatechol, 2-butyl-4-hydroxyanisole, 2,6-ditertiarybutyl-p-cresol and the like.

The use amount of the polymerization inhibitor (E) is preferably 0.001 to 3 parts by mass and more preferably 0.01 to 2 parts by mass based on 100 parts by mass of the total amount of (A) and (B). If the use amount is 0.001 parts by mass or more, storage stability is ensured, and if the use amount is 3 parts by mass or less, a favorable adhesion property is obtained and uncuring does not occur.

In process (4), the first surface of the first translucent rigid substrate and the first surface of the second translucent rigid substrate face each other so that both surfaces are parallel to each other under a predetermined positional relationship in a surface direction. Generally, both translucent rigid substrates face each other in the surface direction so as to precisely overlap each other. A guide rail or frame for moving the translucent rigid substrate to a certain position by restricting a movement direction of the translucent rigid substrate may be considered as means for implementing the facing. In the case where position determination having a higher precision is required, it is preferable to perform the position determination by a bonding apparatus having a position determination mechanism. It is more preferable to attach a mark for alignment to the surface of the translucent rigid substrate and to use a bonding apparatus that can perform position adjustment while imaging the mark by an imaging device in order to perform position determination with a high precision. If misalignment is amended after both translucent rigid substrates are bonded, the fixing agent may leak from a bonding surface or scratches may be formed on the surface of the substrate, and thus, it is preferable to amend misalignment before bonding.

In process (5), bonding is performed so that the fixing agent spreads on the bonding surface by applying a given pressure to the first surface of the first translucent rigid substrate and the first surface of the second translucent rigid substrate while maintaining the positional relationship determined in process (4). In view of the lamination precision, it is preferable that the fixing agent spread in a constant thickness on the entire bonding surface.

If the amount of the applied fixing agent is excessively small, the fixing agent does not spread on the entire bonding surface, thus causing generation of bubbles on the bonding surface. If the bubbles are generated, a positional precision is reduced. If the amount of the applied fixing agent is excessively large, the fixing agent leaks from a gap of the bonding surface. Even if the fixing agent slightly leaks, the fixing agent may be wiped and leakage is not a big problem, but if the leakage amount is large, the fixing agent becomes useless.

Pressure during bonding is concerned with spread of the fixing agent. Accordingly, it is preferable to appropriately adjust the amount of the fixing agent and the bonding pressure. A method of using a bonding apparatus having a function of controlling pressure when the translucent rigid substrates are bonded to each other may be considered as means for implementing the adjustment. Pressure during bonding may be appropriately set in consideration of the aforementioned matters, and, for example, may be 5 to 50 $g/cm^2$ and typically 10 to 30 $g/cm^2$.

Further, controlling of the thickness of the fixing agent may be considered. A method of using a bonding apparatus having a function of controlling a height of the translucent rigid substrate when the translucent rigid substrates are bonded to each other, in addition to the method of mixing the granular material with the fixing agent as described above may be considered as the method of controlling the thickness.

In process (6), the provisionally fastened translucent rigid substrate laminate is formed by irradiating light for curing only the outer boundary portion of the fixing agent interposed and spreading between both translucent rigid substrates while the pressure is maintained. Only the outer boundary portion of the fixing agent is cured to have a cycle shape, both translucent rigid substrates can be bonded with relatively weak force, and as a result, it is possible to prevent misalignment when the translucent rigid substrates are laminated by irradiating light on the outer boundary portion of the fixing agent.

In view of the purpose of not easily causing misalignment of the bonded translucent rigid substrates, the outer boundary portion needs to be a region having a given width, but if light is excessively irradiated to the internal part, the purpose of provisional fastening not causing misalignment is reduced and the irradiation time is increased, thus reducing production efficiency. Typically, the outer boundary portion on which light is irradiated by the LED unit 16 has a width of 5 to 25 mm, and more typically about 7 to 17 mm. Further, it is preferable that the outer boundary portion on which light is irradiated be present in the margin region where a portion of the plate-shaped product is not formed. Afterwards, when the full irradiation is performed, history of light irradiation of the portion where the plate-shaped product is formed may become uniform and distortion of the fixing agent is suppressed. As a result, distortion of the substrate of the portion may be suppressed.

The internal fixing agent is not cured and has fluidity, but since the fixing agent of the outer boundary portion is cured, the fixing agent does not leak from gaps of both translucent rigid substrates. A wavelength of irradiated light may be appropriately changed according to a property of the fixing agent used, but for example, microwaves, infrared rays, visible rays, UV, X-rays, $\gamma$-rays, electron beams and the like may be irradiated. Generally, irradiation light is UV because UV can be simply used and has relatively high energy. As described above, in the present invention, light means electromagnetic waves (energy rays) including a wide wavelength region as well as visible rays.

Light irradiated may be irradiated in an amount required to provisionally fasten the translucent rigid substrates, and when the amount is measured by a cumulative illuminometer using a light receptor of 365 nm, the amount may be generally 1 to 500 $mJ/cm^2$, typically 50 to 450 $mJ/cm^2$, and more typically 200 to 400 $mJ/cm^2$. The irradiation time is generally 1 to 120 sec, typically 2 to 60 sec, and preferably 15 to 45 sec. It is possible to suppress distortion of curing, control the thickness of the fixing agent and increase the lamination precision of the translucent rigid substrate by performing irradiation of light while the bonding pressure is maintained.

In process (7), light for curing the uncured fixing agent present in the provisionally fastened translucent rigid substrate laminate is irradiated, and the fully fastened translucent rigid substrate laminate is formed. Since a lamination precision may be examined at the time of manufacturing the provisionally fastened translucent rigid substrate laminate before the fully fastened translucent rigid substrate laminate is formed, there is an advantage in that when defects occur, the defects are easily repaired. Light may be irradiated to the entire bonding surface of the provisionally fastened translucent rigid substrates in order to cure the uncured fixing agent present in the provisionally fastened translucent rigid substrate laminate. Since the fixing agent of the outer boundary portion is already cured, it is not necessary to irradiate light on the outer boundary portion. In order to uniformalize a curing state of the fixing agent, it is preferable to uniformalize irradiation history of the entire fixing agent interposed between the bonding surfaces. To this end, there is a method of selectively irradiating light on the internal region on which light is not irradiated during provisional fastening. When light is irradiated, it can be considered that the outer boundary portion of the translucent rigid substrate is masked by a material through which UV does not pass. Further, it is preferable that irradiation be performed while a given pressure is applied to the surfaces of the bonded translucent rigid substrates in order to increase a bonding positional precision. It is possible to prevent problems of occurrence of bending of the substrate in a Z-axis direction due to curing shrinkage of the fixing agent, deviation of a pattern, and impossibility of vacuum adsorption by applying the pressure. Applied pressure may be appropriately set in consideration of strength of the translucent rigid substrate, and, for example, may be 5 to 50 g/cm² and typically 10 to 30 g/cm².

The irradiation amount of light irradiated in process (7) is generally 30 to 4,000 mJ/cm², typically 100 to 3,000 mJ/cm², more typically 300 to 2,500 mJ/cm², and preferably 1,000 to 2,000 mJ/cm² when the amount is measured by the cumulative illuminometer using the light receptor of 365 nm. The irradiation time is generally 0.1 to 120 sec, typically 1 to 30 sec, and more typically about 10 to 20 sec.

Before process (7), it is preferable that bubbles mixed with the uncured fixing agent be moved to the position at which shape processing is not performed. The reason for this is explained below. There is a case where bubbles enter a fixing agent layer while provisional fastening is performed. In the case where the full irradiation is performed in a state where bubbles are present, the bubbles are fixed at the position by curing the fixing agent. When the bubbles are present at the position that is subjected to shape processing such as cutting processing, external shape processing or holing processing, in other words, a place that is directly in contact with processing tools (blade or whetstone), tipping occurs. Accordingly, it is possible to prevent occurrence of tipping by moving the bubbles to the position at which shape processing is not performed in advance before the full irradiation is performed. There is a method of moving bubbles by pressing the substrates by hands or rods as a moving means.

In process (8), processes 1) to 7) are repeated at least one time by regarding the fully fastened translucent rigid substrate laminate obtained in process (7) as the first translucent rigid substrate. Accordingly, the fully fastened translucent rigid substrate laminate where at least three translucent rigid substrates are bonded is obtained. In view of an improvement in production efficiency of the plate-shaped product, it is preferable to manufacture the translucent rigid substrate laminate where 10 or more translucent rigid substrates and typically 10 to 30 translucent rigid substrates are laminated.

<Second Embodiment>

In the second embodiment of the method of manufacturing the translucent rigid substrate laminate according to the present invention, the following processes are performed: 1) a process of preparing a first translucent rigid substrate, 2) a process of preparing a second translucent rigid substrate, 3) a process of applying a photo-curable fixing agent to a first surface of the first translucent rigid substrate and/or a first surface of the second translucent rigid substrate, 4) a process of allowing the first surface of the first translucent rigid substrate and the first surface of the second translucent rigid substrate to face each other so that both surfaces are parallel to each other under a predetermined positional relationship in a surface direction, 5) a process of applying a given pressure to the first surface of the first translucent rigid substrate and the first surface of the second translucent rigid substrate while maintaining the positional relationship to bond both translucent rigid substrates, 6) a process of irradiating light for curing only an outer boundary portion of the fixing agent interposed and spreading between both translucent rigid substrates while maintaining the pressure to form a provisionally fastened translucent rigid substrate laminate, 7') a process of repeating processes 1) to 6) at least one time by regarding the provisionally fastened translucent rigid substrate laminate as the first translucent rigid substrate to form the provisionally fastened translucent rigid substrate laminate where at least three translucent rigid substrates are bonded, and 8') a full irradiation process of irradiating light for curing the uncured fixing agent present in the provisionally fastened translucent rigid substrate laminate obtained in process 7') to form a fully fastened translucent rigid substrate laminate.

Processes (1) to (6) are performed in the same procedure as the first embodiment.

After process (6), in the present embodiment, processes (1) to (6) are repeated at least one time by regarding the provisionally fastened translucent rigid substrate laminate as the first translucent rigid substrate, and process (7') of forming the provisionally fastened translucent rigid substrate laminate where at least three translucent rigid substrates are bonded is performed. In the first embodiment, immediately after the provisionally fastened translucent rigid substrate laminate where two translucent rigid substrates are laminated is obtained, the full irradiation is performed to obtain the fully fastened translucent rigid substrate laminate. That is, everytime the provisional irradiation is finished, the full irradiation is performed. In the second embodiment, the full irradiation is not performed immediately after the provisionally fastened translucent rigid substrate laminate is obtained, but the provisionally fastened laminate formed of a plurality of translucent rigid substrates is manufactured by repeating processes (1) to (6).

Thereafter, in process (8'), light for curing the uncured fixing agent present in the obtained provisionally fastened translucent rigid substrate laminate is irradiated, and the fully fastened translucent rigid substrate laminate is formed. Since the full irradiation is performed once on the provisionally fastened laminate formed of a plurality of translucent rigid substrates, the number of full irradiation required to manufacture the fully fastened translucent rigid substrate laminate formed of a plurality of translucent rigid substrates may be reduced, such that production efficiency is improved. However, if the provisionally fastened laminate is constituted by too many translucent rigid substrates, UV does not reach the internal fixing agent when the full irradiation is performed, and it is apt to insufficiently cure the fixing agent, such that it is preferable that the provisionally fastened laminate be constituted by at most five translucent rigid substrates. It is preferable that like process (7), process (8') be performed while a given pressure is applied to the surfaces of the bonded translucent rigid substrates in order to increase a bonding positional precision. Further, because of the same reason as the mention in process (7), before process (8'), it is preferable that the bubbles mixed with the uncured fixing agent be moved to the position at which shape processing is not performed.

<Third Embodiment>

In the third embodiment of the method of manufacturing the translucent rigid substrate laminate according to the present invention, processes (1) to (8') are performed in the same order as the second embodiment, and subsequently, the method further includes 8") a process of repeating processes 1) to 6) at least one time by regarding the fully fastened translucent rigid substrate laminate obtained in process 8') as the first translucent rigid substrate to form a complex translucent rigid substrate laminate, and 8''') a full irradiation process of irradiating light for curing the uncured fixing agent present in the complex translucent rigid substrate laminate obtained in process 8") to form a fully fastened translucent rigid substrate laminate having an increased lamination number.

In the present embodiment, the fully fastened translucent rigid substrate laminate having the increased lamination number is manufactured by further laminating the translucent rigid substrate on the fully fastened translucent rigid substrate laminate. As described above, since there is a limitation in the number of translucent rigid substrates constituting the provisionally fastened laminate, it is required that the provisionally fastened laminate having the number reaching a certain level is subjected to full irradiation to obtain the fully fastened translucent rigid substrate laminate. However, it is possible to manufacture the fully fastened translucent rigid substrate laminate constituted by a plurality of translucent rigid substrates while the number of full irradiation is reduced by laminating the translucent rigid substrates so that bonding of the translucent rigid substrate to the fully fastened translucent rigid substrate laminate and provisional irradiation thereof are repeated and full irradiation is then performed when the number reaches a certain level. It is preferable that like process (7), process (8') be performed while a given pressure is applied to the surfaces of the bonded translucent rigid substrates in order to increase a bonding positional precision. Further, because of the same reason as the mentioned in process (7), it is preferable that before process (8'''), bubbles mixed with the uncured fixing agent be moved to the position at which shape processing is not performed.

<Manufacturing of the Plate-Shaped Product>

The plate-shaped product may be manufactured from the translucent rigid substrate laminate obtained by the method of manufacturing the translucent rigid substrate laminate.

First, in process (9), the translucent rigid substrate laminate is divided in a thickness direction, and the divided translucent rigid substrate laminates are formed in a desired number. The division method is not particularly limited, but examples thereof may include a method of performing division in a rectangular parallelepiped form having the same size by using a disk cutter (diamond disk and cemented carbide disk), a fixed abrasive type or loose abrasive type wire saw, a laser beam, etching (for example: chemical etching or electrolytic etching using hydrofluoric acid, sulfuric acid or the like), and red heat zone (a nichrome wire) alone or in combination thereof. The etching may be used in surface treatment of a cut surface after the division.

Next, in process (10), desired shape processing is performed on each of the divided translucent rigid substrate laminates. In this process, since each of the divided translucent rigid substrate laminates may be integrally processed in a form of desired translucent rigid substrate product, there is an advantage in that a production speed of the translucent rigid substrate product may be significantly increased. The shape processing may be performed by any known means, and examples thereof may include grinding by a rotation whetstone, holing by an ultrasonic wave vibration drill, edge face processing by a rotation brush, holing by etching, edge face processing by etching, external shape processing by etching, flame processing using a burner and the like. The processing method may be used alone or in combination. The etching may be used in surface treatment after the shape processing.

In process (11), the bonded translucent rigid substrates are delaminated, and a plurality of translucent rigid substrate products are formed by heating the translucent rigid substrate laminate after the shape processing. The heating method is not particularly limited, but since the fixing agent is softened in a film form and smoothly separated from each translucent rigid substrate product, a method of immersing the translucent rigid substrate laminate after shape processing in warm water is preferable. The appropriate temperature of warm water depends on the adopted fixing agent, but generally about 60 to 95° C. and preferably 80 to 90° C.

Figure 16:
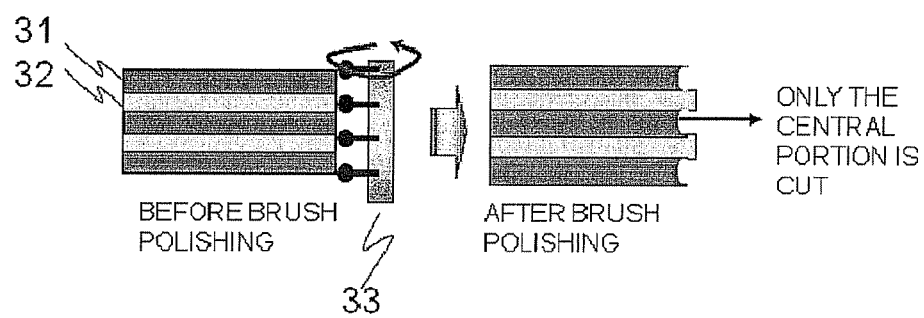
FIG. 16 is a schematic diagram illustrating a state where when an edge face of the substrate laminate is processed, the fixing agent acts as an obstacle, such that the substrate is not subjected to chamfering.

Herein, the edge face of the translucent rigid substrate laminate divided by process (9) has a flat surface by the translucent rigid substrate 31 and the fixing agent 32. If the edge face is processed by a rotation brush 33 and the like, an angulated portion of each translucent rigid substrate is not subjected to chamfering but on the contrary to this, the central portion is excessively cut because the fixing agent acts as an obstacle (FIG. 16), such that impact resistance of the translucent rigid substrate becomes insufficient. Accordingly, it is preferable that adhesion strength of an edge of an external side of the fixing agent exposed to the edge face of the divided translucent rigid substrate laminate be weak so that each translucent rigid substrate is subjected to chamfering while the edge face is processed.

Figure 17:
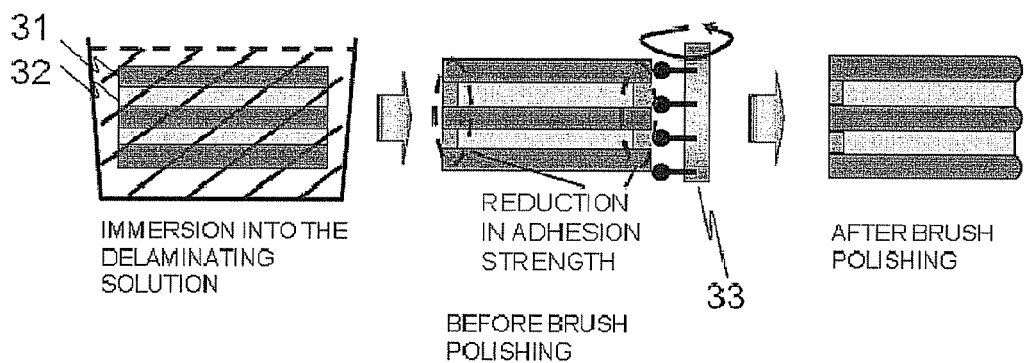
FIG. 17 is a schematic diagram illustrating a state where when the edge face of the substrate laminate is processed, each substrate is subjected to chamfering by reducing adhesion strength of an exposed portion of an edge of an external side of the fixing agent.

Specific examples of the method may include a method of bringing the divided translucent rigid substrate laminates into contact with a delaminating agent under temperature and time conditions required to reduce adhesion strength of an exposed portion of an edge of an external side of the fixing agent interposed between the translucent rigid substrates (for example: immersion, spraying, coating and the like) between processes (9) and (10) (FIG. 17).

The adhesion strength needs to be reduced in a very small region that is about 1 mm or less inward apart from the edge of the external side, and it is required that the temperature and the time are controlled so as not to reduce the adhesion strength of the entire surface of the bonding surface. The liquid temperature, depending on the delaminating agent used, is generally 50° C. or less and typically 20 to 40° C. The contact time is generally 30 min or less and typically 1 to 20 min. If the liquid temperature of the delaminating agent is excessively increased or the contact time is excessively long, the adhesion strength is easily reduced inside the bonding surface, which should be noticed.

The delaminating agent is not particularly limited as long as the delaminating agent is a liquid reducing adhesion strength of the fixing agent, may be appropriately selected according to a property of the fixing agent used, and generally includes one kind or two kinds or more selected from a solvent, an oxidizing agent, and a surfactant.

In the case where the solvent and/or the surfactant are used as the delaminating agent, since the fixing agent coming into contact with the delaminating agent swells to cause distortion at an interface with the substrate, adhesion strength is reduced. Preferably, the swollen fixing agent is cut (incised) by a physical means such as a cutter, and then dried. Accordingly, since the swollen fixing agent shrinks, it is easier to perform edge face processing by a brush and the like. In the case where the oxidizing agent is used as the delaminating agent, the adhesion strength is reduced by carbonizing the fixing agent to cause embrittling. Accordingly, the adhesion strength may be synergistically reduced by using the solvent and/or surfactant together with the oxidizing agent.

The solvent may be any of the inorganic solvent and the organic solvent, and examples thereof may include water, hydrofluoric acid, hydrochloric acid, alcohols (for example: methanol, ethanol, n-propanol, isopropanol, butanol, and benzyl alcohol), esters (for example: ethyl acetate, butyl acetate, normalpropyi acetate, ethyl lactate, dimethyl phthalate, and dimethyl adipate), ketones (for example: methylethylketone (MEK), methylisobutylketone (MIBK), and acetone), chlorine-based solvent (for example:methylene chloride, trichloroethylene, tetrachloroethylene), fluorine-based solvent (for example: hydrochlorofluorocarbon (HCFC), hydrofluorocarbon (HFC), glycolethers (for example: ethyleneglycolmonomethylether (methylcello), ethyleneglycolmonoethylether (ethylcello), ethyleneglycolmonobutylether (butylcello), butylcarbitol (butycarbi), ethyleneglycolmono-t-butyl ether (ETB), propyleneglycolmonomethylether (PGME), propyleneglycolmonomethylether acetate (PGMEA), 3-methoxy-3-methyl-1-butanol (MMB)), amine-based solvent (for example: N-methyl-2-pyrrolidone (NMP), dimethylformamide (DMF), and N,N-dimethylacetamide (DMAC)), ethers (for example: ethylethoxy propionate (EEP) and tetrahydrofuran (THF)), and dimethyl sulfoxide (DMSO).

In the solvent, alcohol may be typically used and benzyl alcohol may be preferably used.

Examples of the oxidizing agent may include sulfuric acid, nitric acid, hydrogen peroxide, ammonium persulfate, acyl peroxide, benzoyl peroxide, tert-butyl peroxide, hydroperoxide, ozone water, perchloric acid, hypochlorous acid and the like.

Any one of an anionic surfactant, a cationic surfactant, an ampholytic surfactant, and a nonionic surfactant may be used as the surfactant.

Examples of the anionic surfactant may include a carboxylic acid type (for example: fatty acid salts, polyoxyethylene alkyl ether carboxylate, N-acylsarcosinate, N-acylglutaminate), a sulfuric ester type (for example: alkyl sulfate, polyoxyethylenealkylether sulfate, alcoholethoxy sulfate, sulfate oil and fat), a sulfonic acid type (for example: alkylbenzene sulfonate, alkane sulfonate, alpha-olefine sulfonate, dialkylsulfo succinic acid, naphthalene sulfonate-formaldehyde condensate, alkyl naphthalene sulfonate, N-methyl-N-acyl taurate), and a phosphoric ester type (for example: alkyl phosphate, polyoxyethylenealkylether phosphate, polyoxyethylenealkylphenylether phosphate), and the like.

Examples of the cationic surfactant may include an amine salt type (for example: alkylamine acetate), and a quaternary ammonium salt type (for example: monoalkylammonium, dialkylammonium, and ethoxylated ammonium).

Examples of the ampholytic surfactant may include a betaine type (for example: alkyldimethylaminoacetic acid betaine, alkylamidepropylbetaine, alkylhydroxysulfobetaine, and alkylhydroxysulfobetaine), alkyldimethylamine oxide and the like.

Examples of the nonionic surfactant may include an ester type (for example: glycerin fatty acid ester, propylene glycol fatty acid ester, sorbitan fatty acid ester, and sucrose fatty acid ester), an ether type (for example: polyoxyethylenealkylether, polyoxyethylenealkylphenylether, and polyoxyethylenepolyoxypropyleneether), an ether ester type (for example: polyoxyethylene sorbitan fatty acid ester and alkylglyceryl ether), an alkylalkanolamide type (fatty acid alkanol amide, fatty acid amidealkylene oxide adducts), and alkylpolyglycoside.

Among the surfactants, the anionic surfactant may be typically used, and the sulfonic acid type anionic surfactant may be preferably used.

It is preferable that the delaminating agent include one kind or two kinds or more selected from water, alcohols, an oxidizing agent and a surfactant in views of safety or environment, and it is more preferable that the delaminating agent include three kinds of water, alcohols, and the surfactant in view of safety. In this case, the delaminating agent preferably includes water, alcohols and the surfactant in a mass ratio of 30 to 50:30 to 50:5 to 20, and, for example, in a mass ratio of 30 to 40:40 to 50:10 to 20. The delaminating agent may be constituted by only these three kinds.

For example, the delaminating agent was manufactured by mixing water, benzyl alcohol and the sulfonic acid type anionic surfactant in a mass ratio of 35:50:15. Further, the plate glass laminate formed of twenty plate glasses was manufactured by using the fixing agent (I) mentioned in the Example to be described below as the fixing agent and using the method according to the present invention. The plate glass laminate was immersed in the delaminating agent at 35° C. for 5 min, and the edge face thereof was then processed by the rotation brush. The edge face after processing was observed by the microscope, and as a result, the angulated portion of each plate glass was subjected to chamfering to have a circle shape. Meanwhile, in the case where edge face processing was performed without immersing in the delaminating agent, the angulated portion of each plate glass was not subjected to chamfering.

Likewise, the plate glass laminate formed of twelve plate glasses was manufactured by using the method according to the present invention. The plate glass laminate was immersed in the delaminating agent at 35° C. for 5 min, and the edge face thereof was then processed by the rotation brush. The edge face after processing was observed by the microscope, and as a result, the angulated portion of each plate glass was subjected to chamfering to have a circle shape. Meanwhile, in the case where edge face processing was performed without immersing in the delaminating agent, the angulated portion of each plate glass was not subjected to chamfering.

<Constitution Example of the Device>

An example of the translucent rigid substrate bonding apparatus according to the present invention will be described. The translucent rigid substrate bonding apparatus according to the present invention is used to manufacture the provisionally fastened translucent rigid substrate laminate where only the outer boundary portion of the bonding surface of the substrate is adhered by the adhesive. The uncured fixing agent interposed between the bonding surfaces of the substrates may be cured during a subsequent process to manufacture the fully fastened translucent rigid substrate laminate where the translucent rigid substrates are completely bonded and the entire bonding surfaces of the substrates are adhered by the adhesive.

The fully fastened translucent rigid substrate laminate may be divided in a thickness direction, and a desired number of the divided translucent rigid substrate laminates may be formed. The desired shape processing is performed on each of the divided translucent rigid substrate laminates, and the bonded translucent rigid substrates may be delaminated and a plurality of plate-shaped products may be formed by heating the translucent rigid substrate laminate (for example: immersion in warm water) after the shape processing.

Each of the translucent rigid substrates may be one translucent rigid substrates to be bonded may be a laminate formed of two or more translucent rigid substrates. The laminate of the translucent rigid substrates may be a provisionally fastened translucent rigid substrate laminate manufactured by the translucent rigid substrate bonding apparatus according to the present invention or a subsequently fully fastened translucent rigid substrate laminate. Typically, it is intended that the translucent rigid substrate laminate where about ten to thirty translucent rigid substrates are laminated is manufactured by using the translucent rigid substrate bonding apparatus according to the present invention.

FIG. 1 is a schematic diagram illustrating a first example of a translucent rigid substrate bonding apparatus according to the present invention. A translucent rigid substrate bonding apparatus 10 comprises a rack 11, an upper stage 12, a press unit 13, an absorption unit 14, an absorption hole 15, an LED unit 16, a lower stage 17, a lower stage moving means 18, a side clamp 19, a coating unit for a lower substrate 20, a coating unit for an upper substrate 21, an imaging unit 22, and an electric component unit 23.

The rack 11 is a base portion on which constitution components of the translucent rigid substrate bonding apparatus 10 are mounted, and the electric component unit 23 is disposed therein. The electric component unit 23 performs sequence control of the constitution components by a programmable logic controller (PLC).

Figure 2:
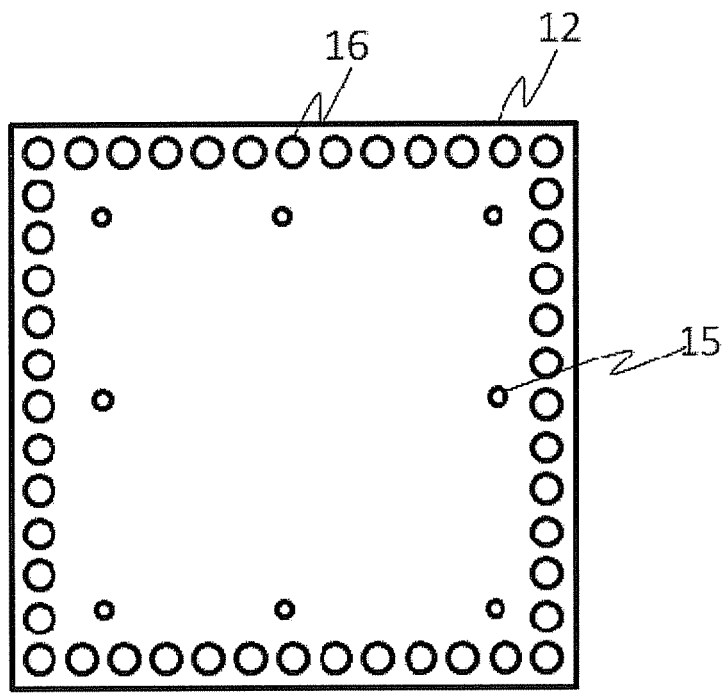
FIG. 2 is a schematic diagram illustrating an example of a lower surface of an upper stage.

The upper stage 12 holds a translucent rigid substrate 25 of the upper side by vacuum adsorption. Accordingly, a plurality of absorption holes 15 are formed in a lower surface of the upper stage 12, and the absorption holes 15 are connected to the absorption unit 14 through pipes. FIG. 2 is a schematic diagram of the lower surface of the upper stage 12, and illustrates a disposal example of the absorption holes 15. A vacuum pump, a vacuum ejector and the like may be used as the absorption unit 14.

The press unit 13 for bonding the substrates while pressing the translucent rigid substrate 25 of the upper side to the translucent rigid substrate 24 of the lower side is connected to the upper portion of the upper stage 12. The press unit 13 has an elevating cylinder (not shown) that can move the upper stage 12 in a Z direction (vertical direction), and may control pressing force, a moving speed, a pressing time and a height thereof by a servo motor.

A plurality of LED units 16 for irradiating UV to the translucent rigid substrate of the upper side 25 in order to cure the fixing agent are embedded on the lower surface of the upper stage 12. The LED units 16 are arranged along the outer boundary of the upper side translucent rigid substrate 25 adsorbed on the upper stage 12. FIG. 2 illustrates an example of an arrangement state of the LED unit 16. The width of the outer boundary portion on which light is irradiated may be increased by disposing the LED units 16 in a row or in two or more rows in parallel.

The LED irradiation time to the translucent rigid substrate is controlled by ON/OFF of power. Light irradiated may be irradiated in an amount required to provisionally fasten the translucent rigid substrates, and when the amount is measured by a cumulative illuminometer using a light receptor of 365 nm, the amount may be generally 1 to 500 mJ/cm$^2$, typically 50 to 450 mJ/cm$^2$, and more typically 200 to 400 mJ/cm$^2$. The irradiation time is generally 1 to 120 sec, and typically about 2 to 60 sec.

The lower stage 17 holds the translucent rigid substrate 24 of the lower side and, at the same time, receives pressure from the upper stage 12 while pressing. The lower stage 17 can be moved in an X-axis direction, a Y-axis direction and a θ-axis direction by the means for moving the lower stage 18. The means for moving the lower stage 18 is constituted by a θ table enabling slewing motion in a horizontal direction and an X table and a Y table enabling horizontal movement. The tables are driven by a motor. The side clamp 19 that is driven by the motor and can be moved in the X-axis direction and the Y-axis direction to determine the position of the mounted translucent rigid substrate is provided on the upper surface of the lower stage 17. A position determination stopper for mounting the translucent rigid substrate at a target position may be provided instead of the side clamp 19 on the upper surface of the lower stage 17. In this case, the translucent rigid substrate is manually loaded at a position at which the translucent rigid substrate is fixed by the stopper. Further, in order to prevent misalignment of the translucent rigid substrate, like the upper stage 12, the translucent rigid substrate 24 of the lower side may be held by vacuum adsorption.

Since the coating unit for the lower substrate 20 is provided with a dispenser 20a of the photo-curable fixing agent and a robot 20b that is connected thereto, can be moved in X-, Y-and Z-axis directions, and is driven by the motor, the fixing agent may be applied in any pattern to the upper surface of the translucent rigid substrate 24 of the lower side. The fixing agent is filled in with a syringe, and automatically and quantitatively discharged. The coating amount is controlled by a digital pressure meter and a coating speed.

The coating unit for the upper substrate 21 automatically applies the photo-curable fixing agent to the lower surface of the translucent rigid substrate 25 of the upper side while the translucent rigid substrate 25 of the upper side is held on the upper stage 12. The coating amount is controlled by a pressure gauge and a coating time. The coating unit for the upper substrate 21 is provided with a robot 21b that has a rotation shaft rotatable in a horizontal direction beside the upper and lower stages and is driven by a motor, a rotary nozzle 21a at an end thereof is disposed below around the center of the upper stage 12 during coating, and the fixing agent is applied from the tip of the nozzle 21a. If the coating is finished, the coating unit for the upper substrate 21 is stored beside the upper and lower stages so as not to disturb bonding of the translucent rigid substrate.

The imaging unit 22 images an alignment mark for position adjustment installed on each surface of the translucent rigid substrate 25 of the upper side and the translucent rigid substrate 24 of the lower side by digital cameras 22a attached to two portions of upper and lower two portions at an end of an arm. The electric component unit 23 detects a relative misalignment state of the translucent rigid substrate 25 of the upper side and the translucent rigid substrate 24 of the lower side based on the obtained image information. Operations of slightly adjusting the position of the lower stage 17 in the X-axis direction, the Y-axis direction and the θ-axis direction by the means for moving the lower stage 18 and amending the misalignment are performed based on the detection result. After the amendment of the misalignment, both translucent rigid substrates are bonded. An analogue camera may be used as the camera in addition to the digital camera using CCD or CMOS as the imaging element, but it is preferable to use the digital camera in view of high resolution.

The imaging unit 22 is provided with a moving means 22b driven by a motor in X- and Y-axis directions, and the digital camera 22a is moved to a target position at which the alignment mark is clearly viewed when imaging is performed. If the imaging is finished, the digital camera 22a is moved so as not to disturb the translucent rigid substrates from being bonded.

The procedure of bonding of the translucent rigid substrates using the translucent rigid substrate bonding apparatus 10 regarding the first example will be described with reference to FIGS. 3 to 13.

Figure 3:
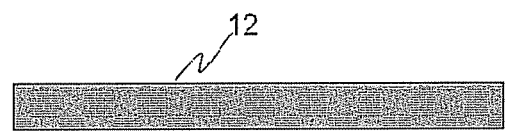
FIG. 3 is a view illustrating a state where a first substrate is mounted on a lower stage.
Figure 3:
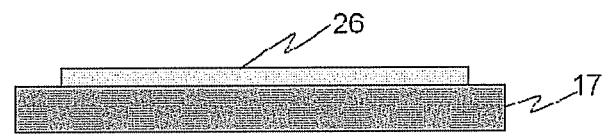
Figure 4:
FIG. 4 is a view illustrating a state where the first substrate mounted on the lower stage is conveyed directly below the upper stage.
Figure 4:
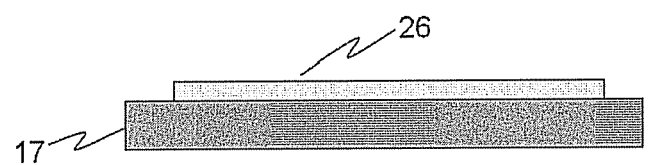
Figure 5:
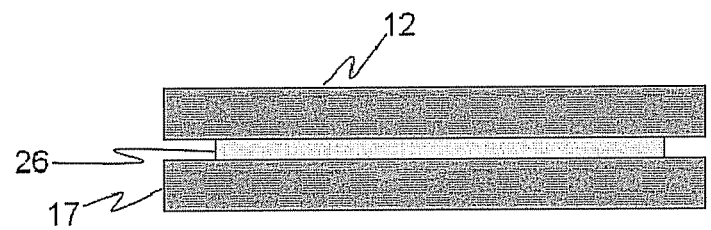
FIG. 5 is a view illustrating a state where the upper stage is lowered to vacuum-adsorb the first substrate.
Figure 6:
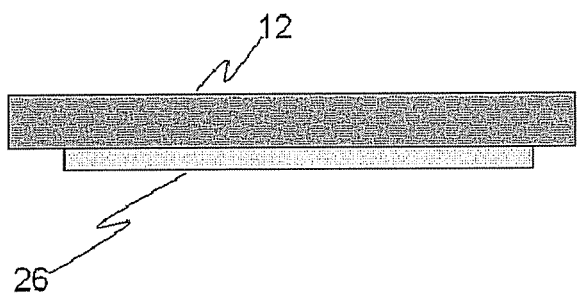
FIG. 6 is a view illustrating a state where the upper stage is raised while the adsorbed first substrate is held.
Figure 6:
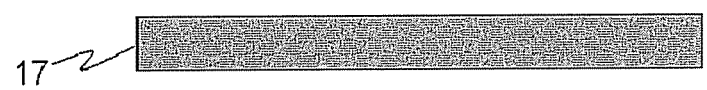

First, the first translucent rigid substrate 26 is mounted on the lower stage 17, and fixed at a target position by the side clamp 19 (not shown) (FIG. 3). The loading of the translucent rigid substrate 26 on the lower stage 17 may be manually performed, but a plurality of translucent rigid substrates 26 may be housed in an exclusive cassette and automatically mounted on the lower stage 17. The mounted translucent rigid substrate 26 is moved directly below the upper stage 12 by the means for moving the lower stage 18 (not shown) (FIG. 4). Subsequently, the upper stage 12 is lowered by the press unit 13. The translucent rigid substrate 26 is vacuum-adsorbed by absorption force from the absorption holes 15 (not shown) (FIG. 5). The adsorbed translucent rigid substrate 26 is held and is raised together with the upper stage 12, and waits for the second substrate (FIG. 6).

Figure 7:
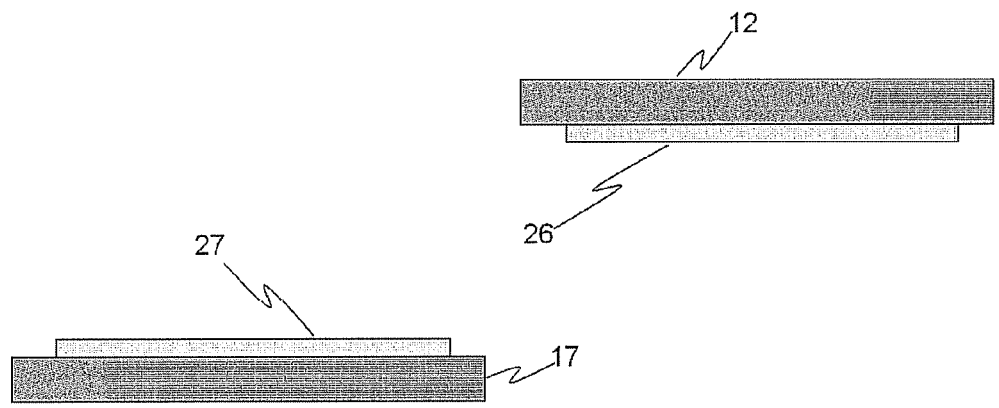
FIG. 7 is a view illustrating a state where a second substrate is mounted on the lower stage.
Figure 8:
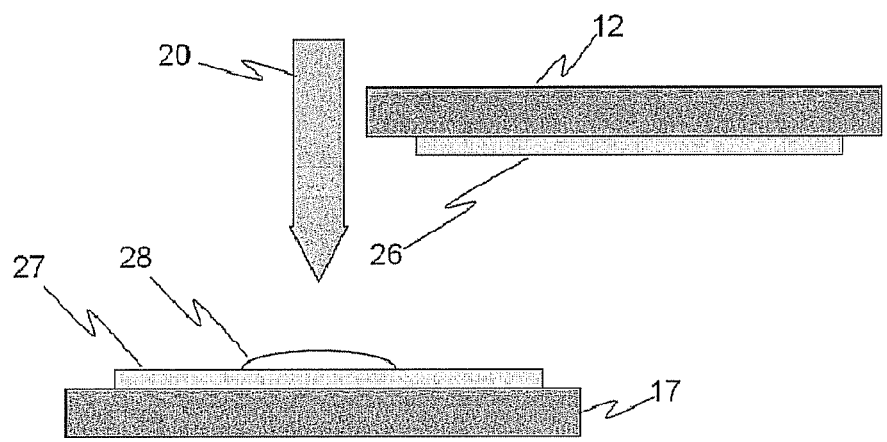
FIG. 8 is a view illustrating a state where a fixing agent is applied to an upper surface of the second substrate.
Figure 9:
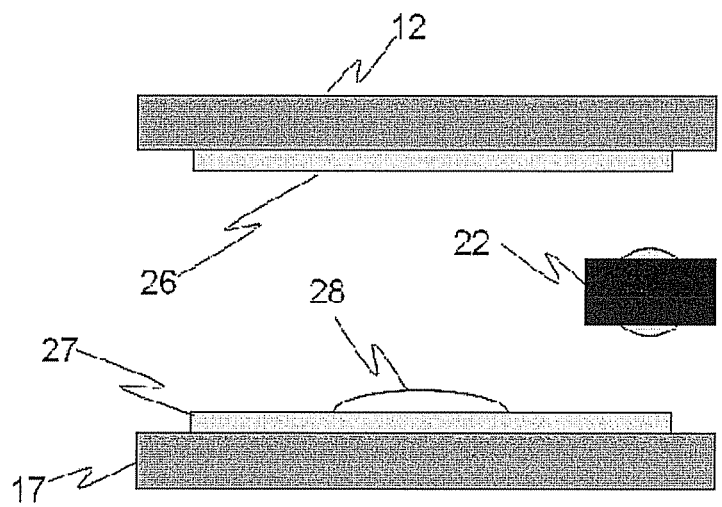
FIG. 9 is a view illustrating a state where the second substrate mounted on the lower stage is conveyed directly below the upper stage and an alignment mark attached to the surfaces of both the substrates is imaged by a camera.

Next, the second translucent rigid substrate 27 is mounted on the lower stage 17, and fixed at a target position by the side clamp 19 (not shown) (FIG. 7). The fixing agent 28 is applied in a predetermined pattern from the coating unit for the lower substrate 20 on the upper surface of the second translucent rigid substrate 27 (FIG. 8). After the coating is completed, if the second translucent rigid substrate 27 mounted on the lower stage 17 is moved directly below the upper stage 12, the alignment mark is imaged by the camera attached to the front end of the arm of the imaging unit 22, and the position of the lower stage 17 is slightly adjusted according to the imaging result for positional adjustment of both translucent rigid substrates 26 and 27 (FIG. 9).

Figure 10:
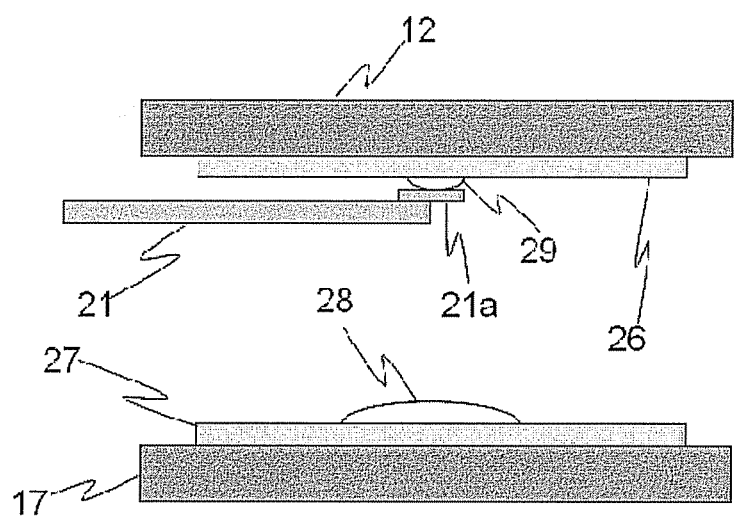
FIG. 10 is a view illustrating a state where the fixing agent is applied to the lower surface of the first substrate held on the upper stage.
Figure 11:
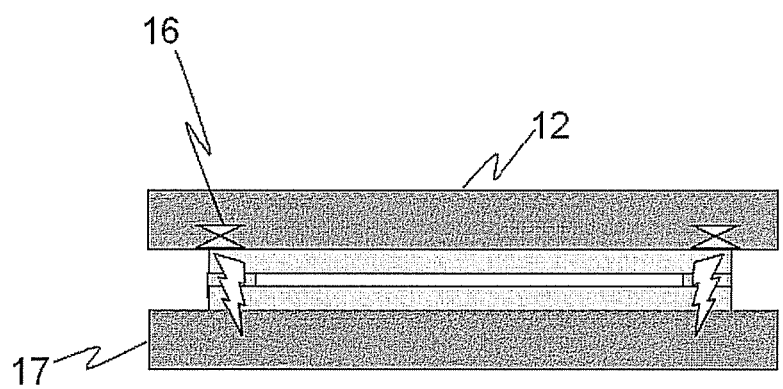
FIG. 11 is a view illustrating a state where the upper stage is lowered to bond two substrates and UV is irradiated to an outer boundary portion of the substrate.

After the positional adjustment, the nozzle 21a attached to the front end of the arm of the coating unit for the upper substrate 21 is moved to around the center of the first substrate 26 held on the upper stage 12, and the fixing agent 29 is applied from the nozzle 21a on the lower surface of the first translucent rigid substrate 26 (FIG. 10). After the fixing agents 28 and 29 are applied on the translucent rigid substrates 26 and 27 of the upper side and the lower side, if the upper stage 12 is lowered by the press unit 13 and two translucent rigid substrates 26 and 27 are bonded by pressing, the fixing agents 28 and 29 interposed between the translucent rigid substrates of the upper side and the lower side spread on the entire surface of the translucent rigid substrate by pressing. While the pressing state is maintained, UV is irradiated from the LED unit 16 on the outer boundary portion of the translucent rigid substrate (FIG. 11). Accordingly, only the fixing agent 31 on the outer boundary portion is cured. The internal fixing agent 30 is not cured and has fluidity, but since the fixing agent 31 of the outer boundary portion is cured, the fixing agent does not leak from gaps of both translucent rigid substrates.

Figure 12:
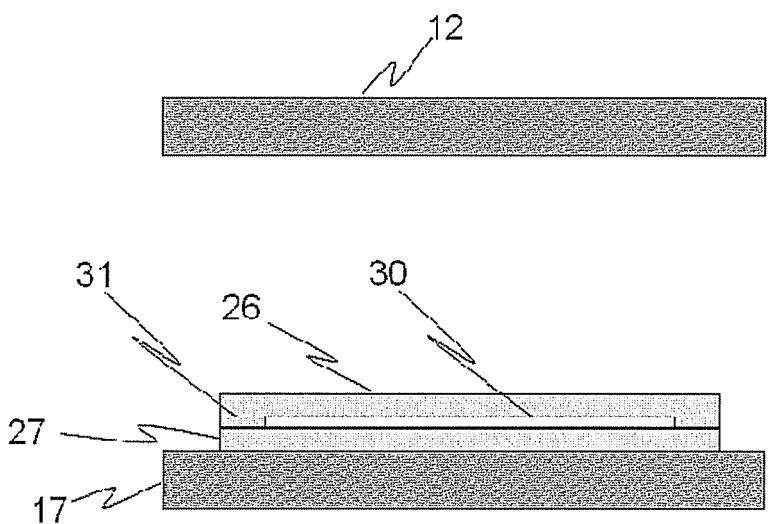
FIG. 12 is a view illustrating a state where the upper stage is raised after irradiation of UV.
Figure 13:
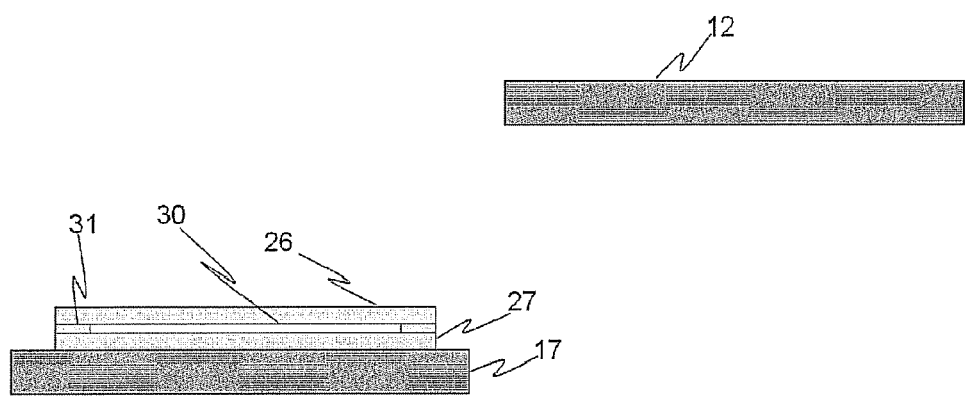
FIG. 13 is a view illustrating a state where the bonded substrates are conveyed back to the original position by the lower stage.

After UV is irradiated, adsorption to the substrate 26 of the upper side is removed, and only the upper stage 12 is raised (FIG. 12). The bonded translucent rigid substrates are conveyed back to the original position by the lower stage 17 (FIG. 13). The bonding of the translucent rigid substrates is completed by the aforementioned process.

Figure 14:
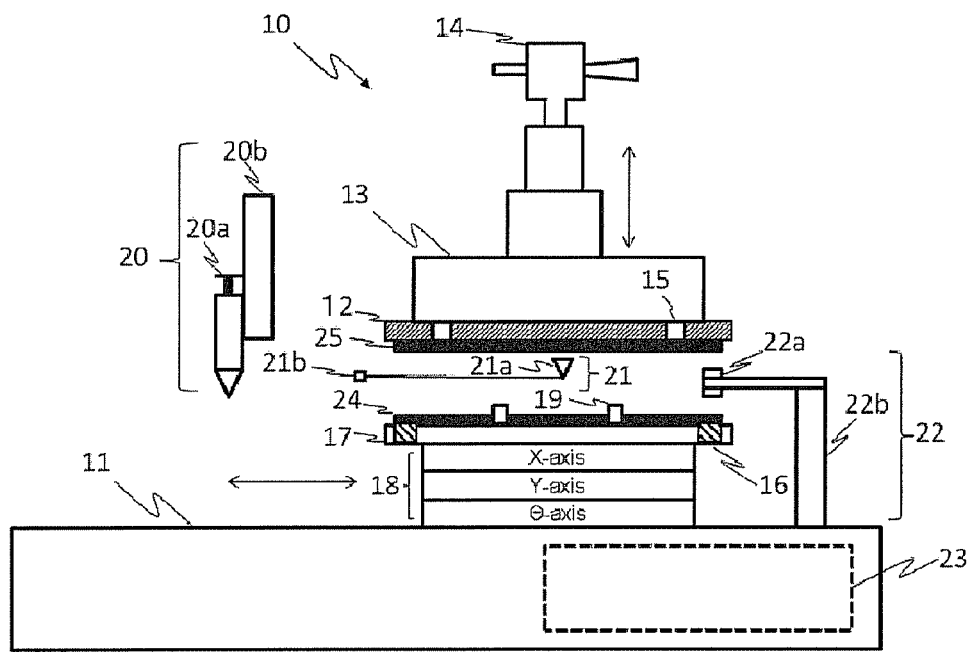
FIG. 14 is a schematic diagram illustrating a second example of a substrate bonding apparatus usable in the practice of the present invention.

FIG. 14 is a schematic diagram illustrating a second embodiment of a translucent rigid substrate bonding apparatus according to the present invention. In the present embodiment, the LED units 16 are arranged along the outer boundary of the translucent rigid substrate 24 of the lower side on the upper surface of the lower stage 17, and UV is irradiated upward.

Figure 15:
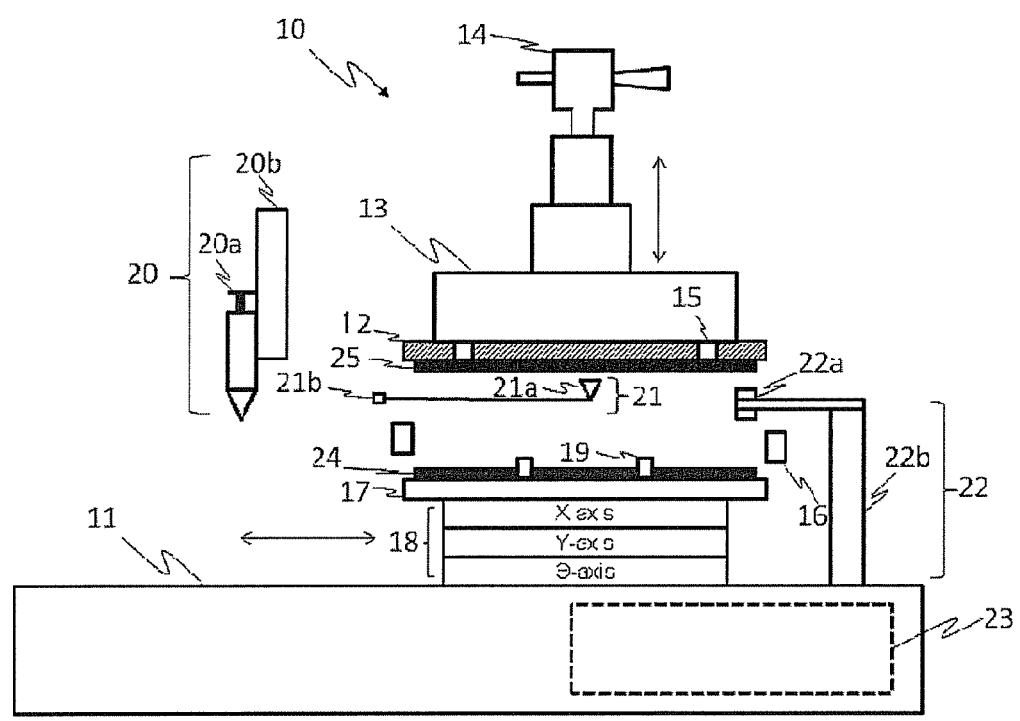
FIG. 15 is a schematic diagram illustrating a third example of a substrate bonding apparatus usable in the practice of the present invention.

FIG. 15 is a schematic diagram illustrating a third embodiment of a translucent rigid substrate bonding apparatus according to the present invention. The LED units 16 are arranged so as to surround the lateral surfaces of the outer boundary of both the bonded translucent rigid substrates, and irradiate UV on the lateral surfaces of the outer boundary. The LED unit 16 has a moving means in a Z-axis direction, and can be moved to an appropriate height according to the height of the bonding surface.

EXAMPLE

For an example, according to the present invention, processes (1) to (6) were performed and the provisionally fastened translucent rigid substrate laminate was manufactured under the following conditions by using the translucent rigid substrate bonding apparatus described in FIG. 1, and as a result, lamination precision was examined and when defects occurred, the defects were easily repaired. After the provisionally fastened translucent rigid substrate laminate was manufactured, processes (7) to (8) were further performed under the following conditions to manufacture the fully fastened translucent rigid substrate laminate, and subsequently, processing of processes (9) to (10) was performed. The obtained translucent rigid substrate laminate was delaminated according to process (11), and as a result, the fixing agent was softened in a film form and was smoothly separated from each plate-shaped product.

The following plate glass was used as the translucent rigid substrate. The plate glass each having the dimension of width of 530 mm×length of 420 mm×thickness of 0.7 mm and attached with the plating patterns was used. The photo-curable fixing agent (I) was manufactured by mixing the following components (A) to (E).

(A) As the polyfunctional (meth) acrylates, 20 parts by mass of "UV-3000B" manufactured by The Nippon Synthetic Chemical Industry Co., Ltd. (urethaneacrylate, hereinafter abbreviated as "UV-3000B") and 15 parts by mass of dicyclopentanyl diacrylate ("KAYARAD R-684" manufactured by Nippon Kayaku Co., Ltd., hereinafter abbreviated as "R-684"), (B) as the monofunctional (meth) acrylates, 50 parts by mass of 2-(1,2-cyclohexacarboxyimide)ethyl acrylate ("ARONIX M-140" manufactured by TOAGOSEI CO., LTD., hereinafter abbreviated as "M-140") and 15 parts by mass of phenol 2 mol ethylene oxide-modified acrylate ("ARONIX M-101A" manufactured by TOAGOSEI CO., LTD.), (C) as the photopolymerization initiator, 8 parts by mass of benzyldimethylketal ("IRGACURE651" manufactured by BASF Co., Ltd., hereinafter, abbreviated as "BDK"), (D) as the granular material, 1 part by mass of spherical crosslinked polystyrene particles with an average particle size 100 μm ("GS-100S" manufactured by GANZ CHEMICAL CO., LTD.), and (E) as the polymerization inhibitor, 0.1 parts by mass of 2,2-methylene-bis(4-methyl-6-tertiarybutylphenol) ("Sumilizer MDP-S" manufactured by Sumitomo Chemical Co., Ltd., hereinafter abbreviated as "MDP").

In process (3), 40 g of the fixing agent (I) was applied on each bonding surface of the plate glasses.

In process (5), pressure when bonding is performed was set to 20 $g/cm^2$, and the outer boundary portion irradiated by the LED unit 16 was set to have the width of about 12 mm. In process (6), when the outer boundary portion irradiated by the LED unit 16 was set to have the width of about 12 mm and the photo-curable adhesive was cured, provisional fastening was performed by setting the UV irradiation amount to 300 $mJ/cm^2$ (measured by the cumulative illuminometer by the light receptor of 365 nm) and setting the UV irradiation time to 30 sec. In process (7), the applied pressure was set to 20 $g/cm^2$, and full fastening was performed by setting the amount of irradiation of light, which is measured by the cumulative illuminometer by the light receptor of 365 nm, to 2,000 $mJ/cm^2$, and setting the irradiation time to 20 sec. In process (8), the plate glass laminate formed of twelve plate glasses was manufactured by using the fixing agent (I) and the method according to the present invention. In process (9), the disk cutter (diamond disk) was used and the laminate was divided into a rectangular parallelepiped form (width of 100 mm×length of 55 mm×thickness of 9.6 mm). In process (10), grinding by rotating the whetstone, holing by an ultrasonic wave vibration drill, and edge face processing by the rotation brush were sequentially performed for, shape processing. In process (11), the plate glass laminate was immersed in warm water at 85° C. to be delaminated.

Although the present invention has been described in connection with the embodiments with reference to the drawings, the present invention is not limited to the embodiments but various modifications and changes can be made thereto.

Reference Signs List
10 Translucent rigid substrate bonding apparatus
11 Rack
12 Upper stage
13 Press unit
14 Absorption unit
15 Absorption hole
16 LED unit
17 Lower stage
18 Lower stage moving means
19 Side clamp
20 Coating unit for lower substrate
21 Coating unit for upper substrate
22 Imaging unit
23 Electric component unit
24 Lower substrate
25 Upper substrate
31 Translucent rigid substrate
32 Fixing agent
33 Rotation brush Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of manufacturing a translucent rigid substrate laminate, comprising:
   1) a process of preparing a first translucent rigid substrate,
   2) a process of preparing a second translucent rigid substrate,
   3) a process of applying a photo-curable fixing agent to a first surface of the first translucent rigid substrate and/or a first surface of the second translucent rigid substrate,
   4) a process of allowing the first surface of the first translucent rigid substrate and the first surface of the second translucent rigid substrate to face each other so that both surfaces are parallel to each other under a predetermined positional relationship in a surface direction,
   5) a process of applying a given pressure to the first surface of the first translucent rigid substrate and the first surface of the second translucent rigid substrate while maintaining the positional relationship to bond both translucent rigid substrates,
   6) a process of irradiating light for curing only an outer boundary portion of the fixing agent interposed and spreading between both translucent rigid substrates while the pressure is maintained to form a provisionally fastened translucent rigid substrate laminate,
   7) a full irradiation process of irradiating light for curing the uncured fixing agent present in the provisionally fastened translucent rigid substrate laminate to form a fully fastened translucent rigid substrate laminate, and
   8) a process of repeating processes 1) to 7) at least one time by regarding the fully fastened translucent rigid substrate laminate as the first translucent rigid substrate to form the fully fastened translucent rigid substrate laminate where at least three translucent rigid substrates are bonded.

2. A method of manufacturing a translucent rigid substrate laminate, comprising:
   1) a process of preparing a first translucent rigid substrate,
   2) a process of preparing a second translucent rigid substrate,
   3) a process of applying a photo-curable fixing agent to a first surface of the first translucent rigid substrate and/or a first surface of the second translucent rigid substrate,
   4) a process of allowing the first surface of the first translucent rigid substrate and the first surface of the second translucent rigid substrate to face each other so that both surfaces are parallel to each other under a predetermined positional relationship in a surface direction,
   5) a process of applying a given pressure to the first surface of the first translucent rigid substrate and the first surface of the second translucent rigid substrate while maintaining the positional relationship to bond both translucent rigid substrates,
   6) a process of irradiating light for curing only an outer boundary portion of the fixing agent interposed and spreading between both translucent rigid substrates while maintaining the pressure to form a provisionally fastened translucent rigid substrate laminate,
   7') a process of repeating processes 1) to 6) at least one time by regarding the provisionally fastened translucent rigid substrate laminate as the first translucent rigid substrate to form the provisionally fastened translucent rigid substrate laminate where at least three translucent rigid substrates are bonded, and
   8') a full irradiation process of irradiating light for curing the uncured fixing agent present in the provisionally fastened translucent rigid substrate laminate obtained in process 7') to form a fully fastened translucent rigid substrate laminate.

3. The method of manufacturing a translucent rigid substrate laminate according to claim 2, further comprising:
   8") a process of repeating processes 1) to 6) at least one time by regarding the fully fastened translucent rigid substrate laminate obtained in process 8') as the first translucent rigid substrate to form a complex translucent rigid substrate laminate, and
   8"') a full irradiation process of irradiating light for curing the uncured fixing agent present in the complex translucent rigid substrate laminate obtained in process 8") to form a fully fastened translucent rigid substrate laminate having an increased lamination number.

4. The method of manufacturing a translucent rigid substrate laminate according to claim 2, wherein the translucent rigid substrate laminate is to be processed to form plate-shaped products and wherein the outer boundary portion is present in a margin region where a portion of the plate-shaped products is not formed.

5. The method of manufacturing a translucent rigid substrate laminate according to claim 2, wherein the full irradiation process is performed while the given pressure is applied to surfaces of the bonded translucent rigid substrates.

6. The method of manufacturing a translucent rigid substrate laminate according to claim 2, wherein the full irradiation process is performed after bubbles mixed with the uncured fixing agent are moved to a position at which shape processing is not performed.

7. The method of manufacturing a translucent rigid substrate laminate according to claim 2, wherein a mark for alignment is attached to a surface of each translucent rigid substrate, and process 4) includes performing position adjustment while imaging the mark by an imaging device.

8. The method of manufacturing a translucent rigid substrate laminate according to claim 2, wherein a given printing pattern and/or plating pattern for exhibiting any one of the functions of a plate-shaped product is attached to a surface of each translucent rigid substrate.

9. The method of manufacturing a translucent rigid substrate laminate according to claim 2, wherein the fixing agent includes a granular material.

10. The method of manufacturing a translucent rigid substrate laminate according to claim 2, wherein the amount of irradiation of light in process 6) is in the range of 1 to 500 mJ/cm$^2$ when measured by a cumulative illuminometer using a light receptor of 365 nm.

11. The method of manufacturing a translucent rigid substrate laminate according to claim 2, wherein each of the first and second translucent rigid substrates is a plate glass.

12. A method of manufacturing a plate-shaped product, comprising:
   9) a process of dividing the translucent rigid substrate laminate obtained by using the method according to claim 2 in a thickness direction to form a desired number of the divided translucent rigid substrate laminates, 10) a process of performing desired shape processing on each of the divided translucent rigid substrate laminates, and
   11) a process of heating the translucent rigid substrate laminate after the shape processing to delaminate the bonded translucent rigid substrates from each other and form a plurality of plate-shaped products.

13. The method of manufacturing a plate-shaped product according to claim 12, further comprising:
   a process of bringing the divided translucent rigid substrate laminates into contact with a delaminating agent under temperature and time conditions required to reduce adhesion strength of an exposed portion of an edge of an external side of the fixing agent interposed between the translucent rigid substrates between processes 9) and 10).

14. The method of manufacturing a plate-shaped product according to claim 13, wherein the delaminating agent includes one kind or two kinds or more selected from a solvent, an oxidizing agent and a surfactant.

15. The method of manufacturing a plate-shaped product according to claim 13, wherein the delaminating agent includes one kind or two kinds or more selected from water, alcohols, an oxidizing agent and a surfactant.

16. The method of manufacturing a plate-shaped product according to claim 15, wherein the delaminating agent includes the water, the alcohols and the surfactant in a mass ratio of 30 to 50 : 30 to 50 : 5 to 20.

17. The method of manufacturing a plate-shaped product according to claim 13, wherein the delaminating agent includes benzyl alcohol.

18. The method of manufacturing a plate-shaped product according to claim 13, wherein the delaminating agent includes an anionic surfactant.

19. The method of manufacturing a plate-shaped product according to claim 18, wherein the delaminating agent includes a sulfonic acid type surfactant.

20. The method of manufacturing a plate-shaped product according to claim 13, wherein a liquid temperature of the delaminating agent is 20 to 40° C. and a contact time to the delaminating agent is 1 to 20 min.

* * * * *